(12) United States Patent
Nagel et al.

(10) Patent No.: US 8,406,933 B2
(45) Date of Patent: Mar. 26, 2013

(54) SYSTEMS AND METHODS FOR ESTIMATING THE EFFECTS OF A REQUEST TO CHANGE POWER USAGE

(75) Inventors: Paul E. Nagel, Draper, UT (US); William B. West, Sandy, UT (US)

(73) Assignee: Control4 Corporation, Salt Lake City, UT (US)

( * ) Notice: Subject to any disclaimer, the term of this patent is extended or adjusted under 35 U.S.C. 154(b) by 233 days.

(21) Appl. No.: 12/858,199

(22) Filed: Aug. 17, 2010

(65) Prior Publication Data

US 2011/0046806 A1    Feb. 24, 2011

Related U.S. Application Data

(60) Provisional application No. 61/234,963, filed on Aug. 18, 2009.

(51) Int. Cl.
*G06F 19/00* (2006.01)
(52) U.S. Cl. .................. 700/286; 713/300
(58) Field of Classification Search .................. 700/286, 700/291, 295; 713/300, 320; 719/318
See application file for complete search history.

(56) References Cited

U.S. PATENT DOCUMENTS

| | | | |
|---|---|---|---|
| 7,877,235 B2 * | 1/2011 | McConnell et al. | 702/188 |
| 2003/0094610 A1 * | 5/2003 | Aoki et al. | 257/48 |
| 2003/0229900 A1 | 12/2003 | Reisman | |
| 2007/0053513 A1 | 3/2007 | Hoffberg | |
| 2007/0239317 A1 * | 10/2007 | Bogolea et al. | 700/276 |
| 2007/0244604 A1 * | 10/2007 | McNally | 700/291 |
| 2008/0147465 A1 * | 6/2008 | Raines et al. | 705/7 |
| 2008/0177678 A1 | 7/2008 | Di Martini et al. | |

OTHER PUBLICATIONS

ZigBee Alliance, "ZigBee Specification," ZigBee Document 053474r17, Jan. 2008.
Leeds, David J., "The Smart Grid in 2010: Market Segments, Applications and Industry Players," GTM Research, Jul. 2009.
International Search Report issued for International Patent Application No. PCT/US2010/045913 on Oct. 6, 2010.
International Preliminary Report on Patentability issued for International Patent Application No. PCT/US2010/045913 on Mar. 1, 2012.

* cited by examiner

*Primary Examiner* — Kidest Bahta
(74) *Attorney, Agent, or Firm* — Austin Rapp & Hardman

(57) ABSTRACT

Systems and methods for estimating the effects of a request to change power usage are described. Device data about one or more devices may be received. User behavior data about past and anticipated user behavior may be received. Effects of a request to change power usage on a power grid may be estimated using the device data and the user behavior data. Whether to send the request to change power usage may be determined based on the estimated effects.

44 Claims, 15 Drawing Sheets

SYSTEMS AND METHODS FOR ESTIMATING THE EFFECTS OF A REQUEST TO CHANGE POWER USAGE

RELATED APPLICATIONS

This application is related to and claims priority from U.S. Provisional Patent Application Ser. No. 61/234,963, filed Aug. 18, 2009, for "Systems and Methods for Estimating the Effects of a Request to Change Power Usage," with inventors Paul E. Nagel and William B. West.

TECHNICAL FIELD

The present disclosure relates generally to electricity generation. More specifically, the present disclosure relates to estimating the effects of a request to change power usage.

BACKGROUND

In recent years, the price of electronic devices has decreased dramatically. In addition, the types of electronic components that can be purchased have continued to increase. For example, DVD players, large screen TVs, multi-carousel CD and DVD players, MP3 players, video game consoles, and similar consumer electronic items have become more widely available while continuing to drop in price.

The decreasing prices and increasing types of electronic components have packed today's homes and businesses with modern conveniences. As more of these components are sold, the average household power consumption also increases. Typical homes and businesses now include more power-consuming devices than ever before. With the increasing demands for power, at times power consumption may approach the limit on the capacity to generate power. If the consumption gets too close to the upper limit on power generation capacity, power outages and/or disruptions, such as blackouts and brownouts, may occur.

To avoid such power disruptions, a region may build infrastructure to increase power generation. However, increasing power generation for a geographic region is often very expensive. Thus, it may be more cost effective to determine ways to decrease consumption at certain times. As such, there is a need for improved systems and methods for decreasing power consumption while limiting the adverse effects as much as possible.

DETAILED DESCRIPTION

Figure 1A:
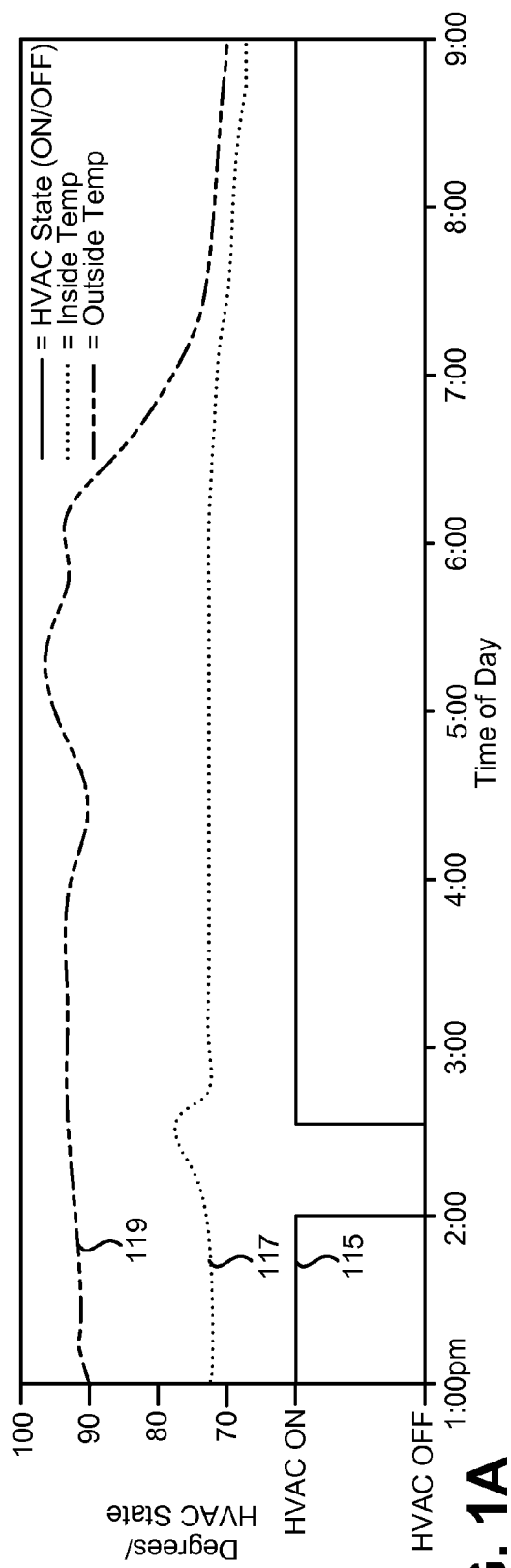
FIG. 1A is a chart illustrating one configuration of a system using the directive model.

A method for estimating the effects of a request to change power usage is disclosed. Device data about one or more devices is received from a home area network. User behavior data about the devices is received. Effects on a power grid of a request to change power usage are estimated using the device data and the user behavior data. It is determined whether to send the request to change power usage based on the estimated effects.

In one configuration, power data about power generation in the power grid may be received. Effects on the power grid of a request to change power usage may be estimated using the device data, the user behavior data, and the power data. Customer preferences about the devices may also be received. Effects on the power grid of a request to change power usage may be estimated using the device data, the user behavior data, and the customer preferences.

The user behavior data may include one or more of the following: past device responses to requests to change power usage, typical behavior of the devices as a function of time, suggestions for reduction in power consumption, typical loads of the devices, typical loads of the house in which the devices reside, and anticipated power consumption of the devices.

The request to change power usage may not be sent based on a determination that the request to change power usage should not be sent. Alternatively, the request to change power usage may be sent using one or more of the following: Z-Wave by Zensys, ZigBee Smart Energy (ZigBee SE), ZigBee Home Automation (ZigBee HA), Global System for Mobile communications (GSM), any of the HomePlug standards, Broadband over Power Lines (BPL), and Power Line Communication (PLC).

The device data may include one or more of the following: device type, geographic location, power consumption, current status, and anticipated power consumption. The power data may include one or more of the following: an amount of power being generated in the power grid, sources of the power being generated, sources of stored power, current weather conditions, and the forecasted weather conditions.

The request to change power usage may be a request for reduced power consumption of one or more devices. The request to change power usage may be sent to the home area network controller for the home area network controller to send to one or more devices. Furthermore, the request to change power usage may be sent to a utility meter that sends it to the home area network controller that sends it to the devices.

In one configuration, the device data and the power data may be stored. Third parties may be allowed to access this stored device data and stored power data. Reports may be generated based on the device data in order to assess the health of the devices.

In one configuration, estimating the effects of the request to change power usage may include estimating the change in revenue associated with the request to change power usage. Estimating the effects of the request to change power usage may also include estimating the change in power consumption associated with the request to change power usage.

An apparatus for estimating the effects of a request to change power usage is also disclosed. The apparatus includes a processor and memory in electronic communication with the processor. Executable instructions are stored in the memory. The instructions are executable to receive device data about one or more devices from a home area network controller. The instructions are also executable to receive user behavior data about the devices. The instructions are also executable to estimate effects of a request to change power usage on a power grid using the device data and the user behavior data. The instructions are also executable to determine whether to send the request to change power usage based on the estimated effects.

A computer-readable medium is also disclosed. The computer-readable medium includes instructions. The instructions are executable for receiving device data about one or more devices from a home area network controller. The instructions are also executable for receiving user behavior data about the devices. The instructions are also executable for estimating effects of a request to change power usage on a power grid using the device data and the user behavior data. The instructions are also executable for determining whether to send the request to change power usage based on the estimated effects.

A method for managing a device based on a request to change power usage is also disclosed. A request to change power usage is received. It is determined how to adjust management of the device based on the request to change power usage, device data, and customer preferences. The management of the device is adjusted based on the determining. Information about the adjustment is stored.

The device data may include one or more of the following: device type, geographic location, power consumption, and current status. The request to change power usage may be a request for reduced power consumption by the device. The request to change power usage may be received using one or more of the following: Z-Wave by Zensys, ZigBee Smart Energy (ZigBee SE), ZigBee Home Automation (ZigBee HA), Global System for Mobile communications (GSM), any of the HomePlug standards, Broadband over Power Lines (BPL), and Power Line Communication (PLC). The adjusting may include one or more of the following: taking no action, changing a setting on the device, or turning the device off based on the device data.

An apparatus for managing a device based on a request to change power usage is also disclosed. The apparatus includes a processor and memory in electronic communication with the processor. Executable instructions are stored in the memory. The instructions are executable to receive a request to change power usage. The instructions are also executable to determine how to adjust management of the device based on the request to change power usage, device data, and customer preferences. The instructions are also executable to adjust the management of the device based on the determining. The instructions are also executable to store information about the adjustment.

A computer-readable medium is also disclosed. The computer-readable medium includes instructions. The instructions are executable for receiving a request to change power usage. The instructions are also executable for determining how to adjust management of the device based on the request to change power usage, device data, and customer preferences. The instructions are also executable for adjusting the management of the device based on the determining. The instructions are also executable for storing information about the adjustment.

The terms "power" and "energy" may be used interchangeably herein. It is to be understood that "power" generally refers to a rate of consumption and anything measured in watts, while "energy" generally refers to a unit of work measured in kWh and similar units of energy. However, the term "power" may be used herein to refer to both. Therefore the term "power" as used herein may refer to a rate of transfer, use, or generation of electrical energy as well as electrical energy itself.

As the demand for power approaches the capacity to generate power, it may be desirable to either increase generation capacity, reduce consumption, or some combination of the two. Since increasing generation capacity may be prohibitively expensive, an increasing amount of focus is now on intelligently reducing consumption without affecting lifestyle. One way this problem has been approached has been to use a directive model, where a power generation facility sends a directive to a home to perform a very specific action. For example, the thermostat in a home may receive a message from a power facility requesting that the setting on the home's thermostat be raised by four degrees on a hot day in order to save power. The thermostat may then follow this directive and change the programmed setting. However, identical messages received by different thermostats may produce inconsistent power savings. In other words, these directives may produce different results in different homes, e.g., a home with shade may warm up slower on a hot day than a home with no shade. When the directive has been accomplished (raising the inside temperature by four degrees), then the program may proceed as usual. Therefore, the exact duration and amount of reduction in power consumption may be unknown before a directive is actually sent in this model.

Another way to intelligently reduce power consumption may be an objective model. In this model, a power generation facility may send an objective to a home that is more general, e.g., reduce power consumption. This means that rather than simply sending a specific task, as in the directive model, the objective model allows some type of decision based logic in the home to determine how to accomplish the objective. For example, if the objective is to reduce power consumption by the heating and cooling system by five percent over the next hour, a Home Area Network controller within the home may determine and implement appropriate settings for the heating and cooling system. This objective approach may provide for better power reduction with limited lifestyle adjustments. In other words, the systems and methods disclosed herein may provide benefits to both a utility provider, by allowing for the avoidance of power consumption during peak demand, as well as the utility recipient, by saving money with minimal discomfort and inconvenience.

Figure 1B:
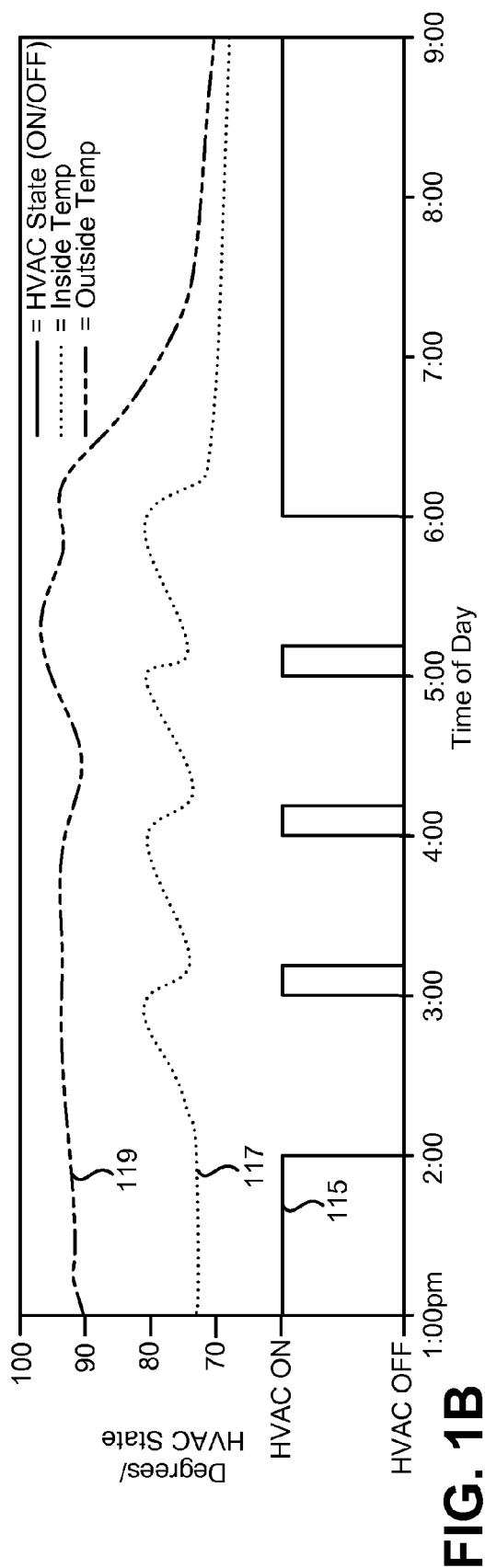
FIG. 1B is a chart illustrating one configuration of a system using the objective model.

FIG. 1A is a chart illustrating one configuration of a system implementing the present systems and methods using the directive model. FIG. 1B is a chart illustrating one configuration of a system implementing the present systems and methods using the objective model. In other words, FIGS. 1A and 1B may further illustrate the distinction between the directive model and the objective model. The solid lines 115 may represent the state of the heating and cooling system as a function of time, e.g., ON or OFF. The dotted lines 117 may represent the temperature inside a home as a function of time. The dashed lines 119 may represent the outside temperature as a function of time.

In FIG. 1A, the home may have received a directive to raise the set point of the heating and cooling system to 78 degrees Fahrenheit. In the illustrated configuration, the outside temperature exceeds 90 degrees. Therefore, the directive may be complied with very quickly. In other words, the heating and cooling system may turn OFF for only one half of an hour, thus resulting in minimal power reduction. In such a configuration, a power provider may have estimated more reduction in power consumption from the directive, and therefore be required to send more directives to achieve the desired power reduction it requires. This may be inefficient and costly.

In FIG. 1B, however, the home may have received an objective to reduce power consumption by 20 percent from 2:00 pm to 6:00 pm. A Home Area Network controller may use decision logic based on a user's preferences and choose to cycle the heating and cooling system in order to comply with the objective. In the illustrated configuration, the heating and cooling system may turn ON for a short period then OFF for a longer period during the specified time period. This may result in slightly higher temperatures during this period, but also vastly reduced power consumption compared to the directive model in FIG. 1A. Therefore, the objective model may provide better power reduction with minimal lifestyle discomfort because it allows decision logic within the home to determine and implement the best way to achieve desired power reduction based on gathered data, e.g., user preferences, current home settings, etc.

The improved power reduction resulting from using the objective model may have several advantages. First, it may allow a utility provider, such as a power company, to more accurately avoid peak demand. As will be discussed below, utility providers may be required to keep a certain percentage of power generation capacity available for critical services, e.g., hospitals, emergency responders, etc. Thus, at peak periods, like midday, the utility provider may be able to send objectives to reduce power consumption in order to avoid peak demand and avoid having to buy more power generation from other providers.

The objective model may also benefit power consumers by saving them money through efficient reduction in power consumption. For example, a power company may determine the rates charged for power by taking the peak consumption period over a defined time period, e.g., the highest day's consumption in the previous month. Therefore, the higher a consumer's peak, the higher the rate charged for the entire month. Under this billing structure, a consumer may wish to limit their peak periods of power consumption in order to reduce their monthly rate. Likewise, a power company may charge a higher flat rate during peak hours than during non-peak hours. Under this billing structure, a consumer may wish to limit consumption during the period with the highest rate. Likewise, a power company may charge a flat rate that changes every hour. Under this billing structure, a consumer may wish to limit their power consumption when they are informed of a high rate for the upcoming hour. Thus, efficient reduction of power consumption may lower a consumer's cost of power under any rate structure, e.g., tiered pricing, flat rate, hourly variable, etc.

Despite the advantages of the objective model, it is still not ideal. More specifically, the exact power reduction in response to an objective may not be known because the various states/configurations and preferences of the homes to which the objective is sent are not known. For example, if a cooling system in a home was not running, an objective to reduce heating and cooling consumption would not result in any reduction. Likewise, a home may not comply with this type of request. It may be inefficient and time-consuming for a power facility to achieve a specific load reduction by trial and error. Therefore, it may be desirable to estimate the effects of a request from a power company or utility system to decrease power consumption (a "demand response") before the request is sent.

Figure 1C:
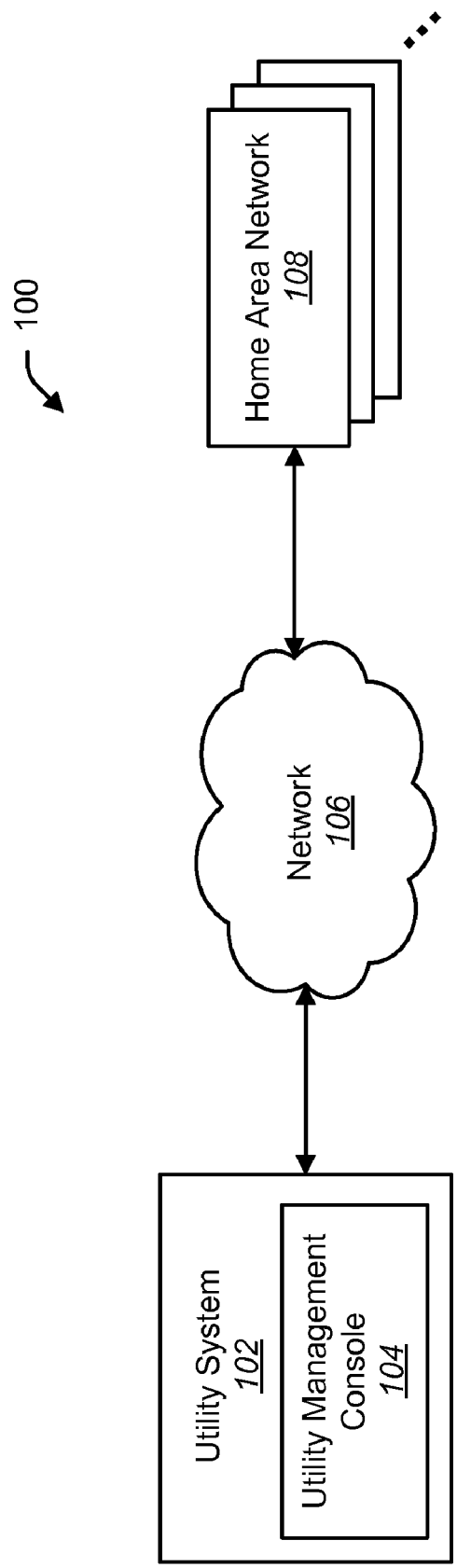
FIG. 1C is a block diagram illustrating one configuration of a system for estimating the effects of a demand response.

FIG. 1C is a block diagram illustrating one configuration of a system 100 for estimating the effects of a demand response. The system 100 may include a utility system 102 that may include a utility management console 104. The utility system 102 may be any system capable of producing, distributing, monitoring, or collecting a desired resource or services. This may include one or more servers, workstations, web sites, databases, etc. The utility system 102 may be centrally located or distributed across several facilities. Examples of a utility system 102 include electricity generation facilities, natural gas distribution facilities, telephone service facilities, etc. The utility system 102 may include a utility management console 104 that may allow the utility system 102 to estimate the effect of a demand response before a demand response is sent. As used herein the term "demand response" refers to a request from the utility system 102 for decreased consumption. A more general request than a demand response is a request to change power usage in some way. The utility management console 104 may estimate the effect of a demand response by collecting data from one or more home area networks (HAN) 108.

A HAN 108 may be a group of controlled devices operating in the same environment. Examples of devices in a HAN 108 include, without limitation, a thermostat, a light switch, a washer, a dryer, a furnace, an air conditioner, a pool controller, etc. The HAN 108 may communicate with the utility system 102 through a network 106. The network 106 may represent the Internet, one or more wide area networks (WANs), one or more local area networks (LANs), etc. Additionally, the network 106 may represent communication using power transmission lines. The network 106 may be implemented using wired and/or wireless communication technologies and may use any available protocols to pass data between the utility system 102 and the HAN 108. These protocols may include, but are not limited to, hypertext transfer protocol (HTTP), file transfer protocol (FTP), secure file transfer protocol (SFTP), Z-Wave by Zensys, ZigBee Smart Energy (ZigBee SE), ZigBee Home Automation (ZigBee HA), Global System for Mobile communications (GSM), any of the HomePlug standards, Broadband over Power Lines (BPL), Power Line Communication (PLC), proprietary serial protocols, etc.

Figure 1D:
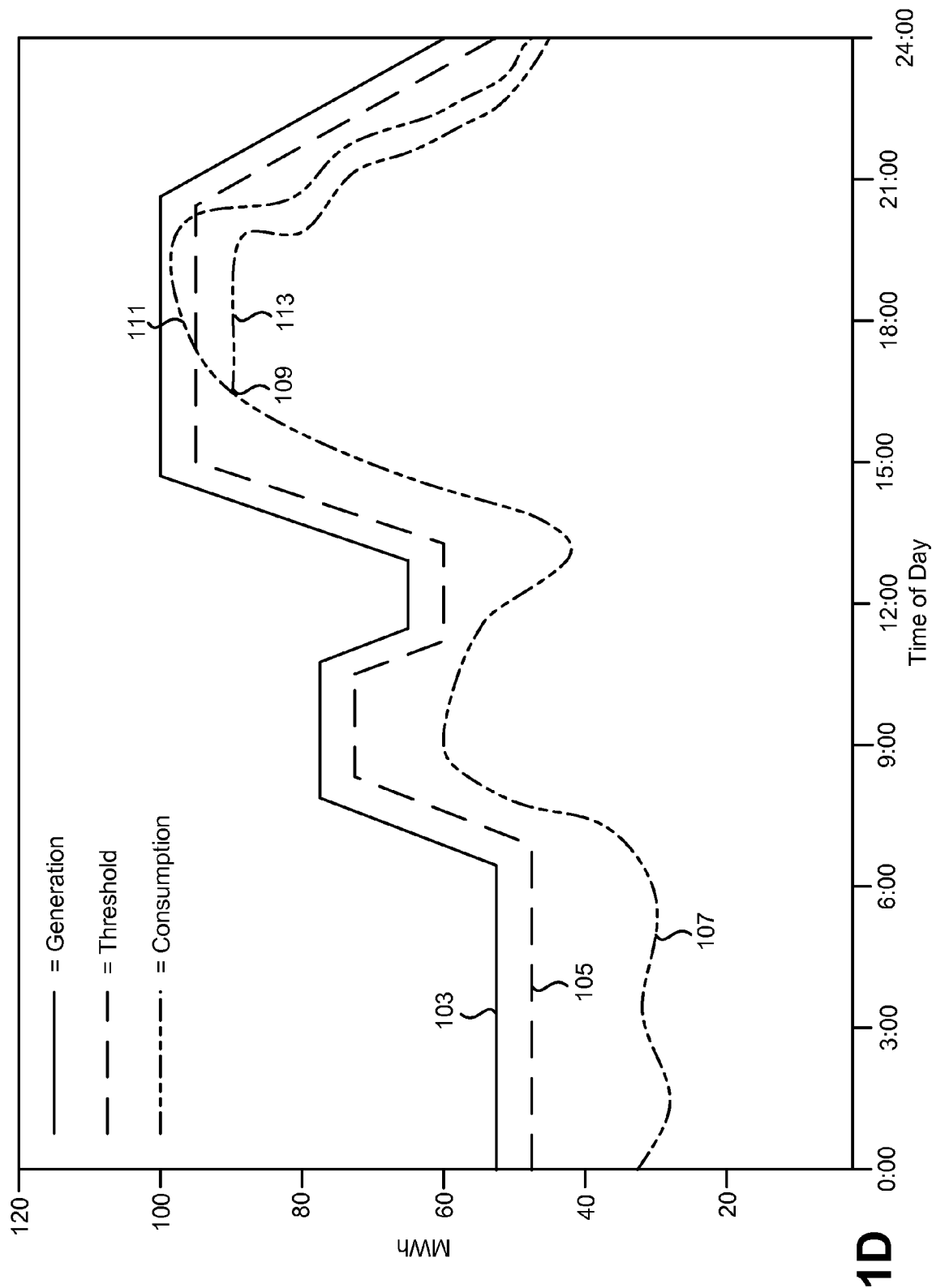
FIG. 1D is a chart illustrating one configuration of a system in which the present systems and methods may be used.

FIG. 1D is a chart illustrating one configuration of a system 100 in which the present systems and methods may be used. The solid line 103 may represent power generation at the utility system 102 in terms of MegaWatt hours (MWh) as a function of time. The dashed line 105 may represent the threshold power generation in terms of MegaWatt hours (MWh) as a function of time. The dotted line 107 may represent the power consumption of a power grid in terms of MegaWatt hours (MWh) as a function of time. The power in the system may be generated using a number of techniques, e.g., nuclear, wind, solar, coal fired, geothermal, etc.

The threshold 105 may define a power generation buffer that should be maintained. The buffer may represent line loss in delivering the power as well as capacity that should be kept available for critical services, e.g., hospitals, emergency responders, etc. In other words, the utility system 102 may be required to maintain the gap between the power generation 103 and the threshold 105. In order to maintain this buffer, the power consumption 107 may not increase above the threshold 105. As mentioned earlier, a utility system 102 may increase power generation 103, which can be very costly and time-delayed, or decrease power consumption 107. One way of reducing power consumption 107 may be to send a demand response.

In one configuration, the utility system 102 may monitor the power consumption 107 in the system 100 to identify trends 109 of increased consumption that may indicate that power consumption 111 will exceed the threshold 105. When a trend 109 is identified, the utility system 102 may send a demand response that causes the power consumption 113 to stay below the threshold 105. In other words, a demand response may prevent the power consumption 111 that exceeds the threshold 105, and, instead, keep power consumption 113 below the threshold 105. The present systems and methods may enable utility systems 102 to estimate the effects of a demand response in order to preserve the buffer between the threshold 105 and the power generation 103.

Figure 2:
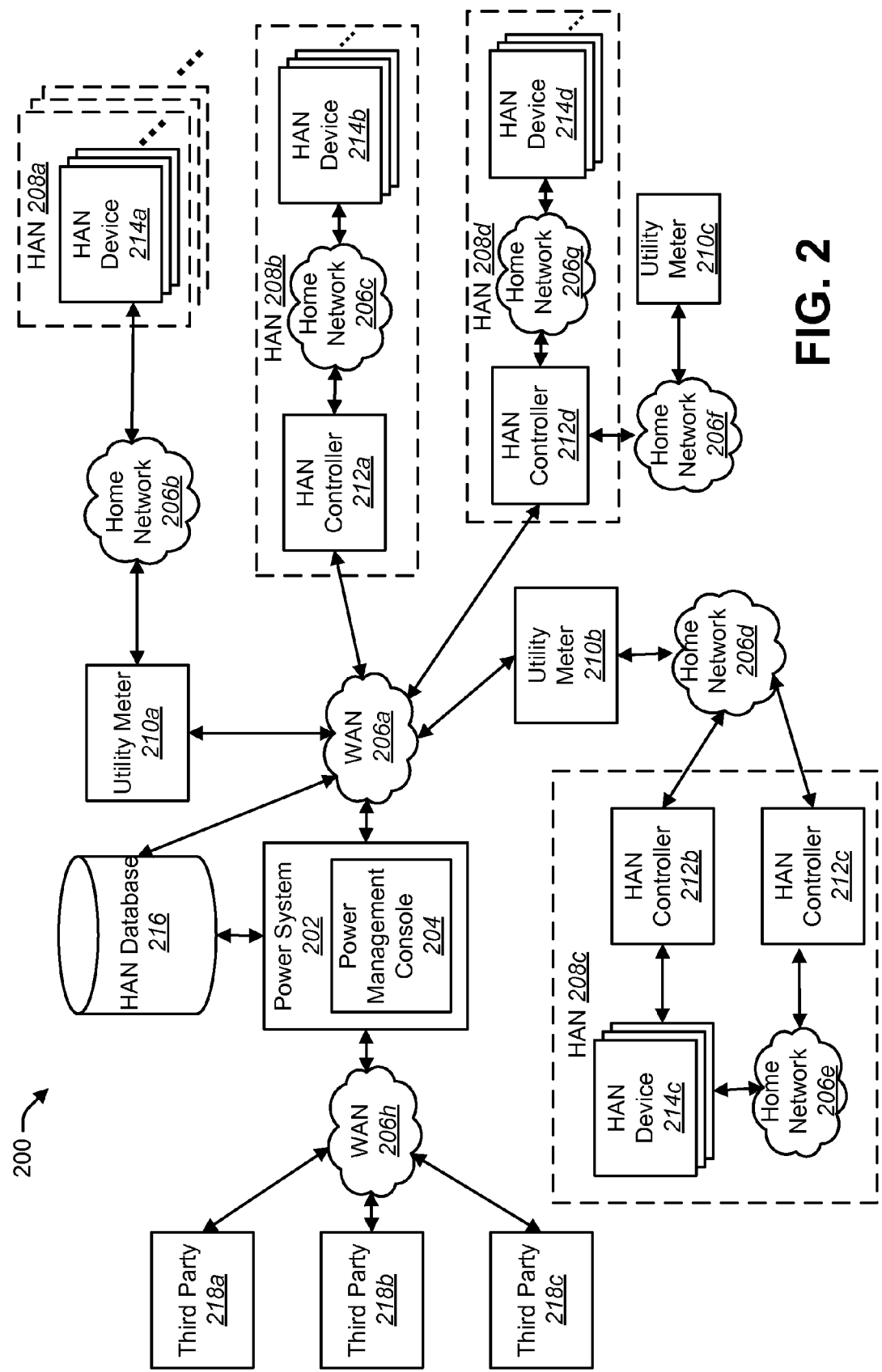
FIG. 2 is a block diagram illustrating another configuration of a system for estimating the effects of a demand response.

FIG. 2 is a block diagram illustrating another configuration of a system 200 for estimating the effects of a demand response. There may be a power system 202 that may include a power management console 204 capable of estimating the effects of a demand response. The power system 202 may communicate with one or more HANs 208 through one or more networks 206, e.g., wide area networks (WAN), and home networks. The power system 202 may be a facility, or part of a facility, that generates power for a geographic region using a variety of techniques. Additionally, the power system 202 may utilize one or more utility meters 210, or HAN controllers 212, or both when communicating with HANs 208. The utility meter 210 may be any device capable of measuring consumption of a utility, such as power, and communicating with a power system 202, a HAN controller 212, or a HAN 208. Additionally, the utility meter 210 may be capable of receiving and sending communications using various protocols, e.g., ZigBee SE, ZigBee HA, GSM, HomePlug standards, BPL, PLC, proprietary serial protocols, etc. Examples of utility meters 210 may include a power/electricity meter, a water meter, a gas meter, etc.

Many configurations of networks 206 are possible. For example, in one configuration, the power system 202 communicates with third parties 218, utility meters 210, and HANs 212 using WANs 206a, 206h with spread spectrum designed to cover a large geographic area. Likewise, the communication between the utility meters 210 and the HANs 208 and within the HANs 208 may use home networks 206b, 206c, 206d, 206e, 206f, 206g using infrared or serial technology designed for short-range, cost-effective communication. Many different configurations of networks 206 may be possible, e.g. the WANs 206a, 206h may use 802.11 technology and the home networks 206b, 206c, 206d, 206e, 206f, 206g may use GSM technology. Any configuration capable of transmitting data between the various illustrated devices may be used.

The HAN controller 212 may be a device capable of communicating with the power system 202, utility meters 210, or HANs 208 using the ZigBee protocol. The controller 212 may control the various devices 214 in the HANs 208, according to user preferences and received demand responses, and may store various data about the devices 214 and the HANs 208 as a whole. Each controller 212 may control one or more HANs 208. Alternatively, there may be more than one controller 212b, 212c for one HAN 208c. Additionally, the utility meter 210a may communicate directly with a HAN 208a without a HAN controller 212.

The system 200 may also include a HAN database 216 that may store data from the controllers 212 and/or devices 214 in the system 200 for use in the power management console 204. The collected data may represent current states and information about devices. For example, the database 216 may receive data directly from one or more devices 214a or from a controller 212a that has already collected data from one or more devices 214b. Additionally, one or more third parties 218 may access the data stored on the database 216 through the power management console 204. Alternatively, the third parties 218 may access the database 216 directly.

In addition to collected data, the HAN database 216 may store data that has been learned by the HAN controllers 212 from the behavior of the HAN devices 214. This data may include, without limitation, house load coefficients and set point convergence factors for heating and cooling, thermostat cycling performance, anticipated power consumption, recommended power saving tips, etc.

Figure 3:
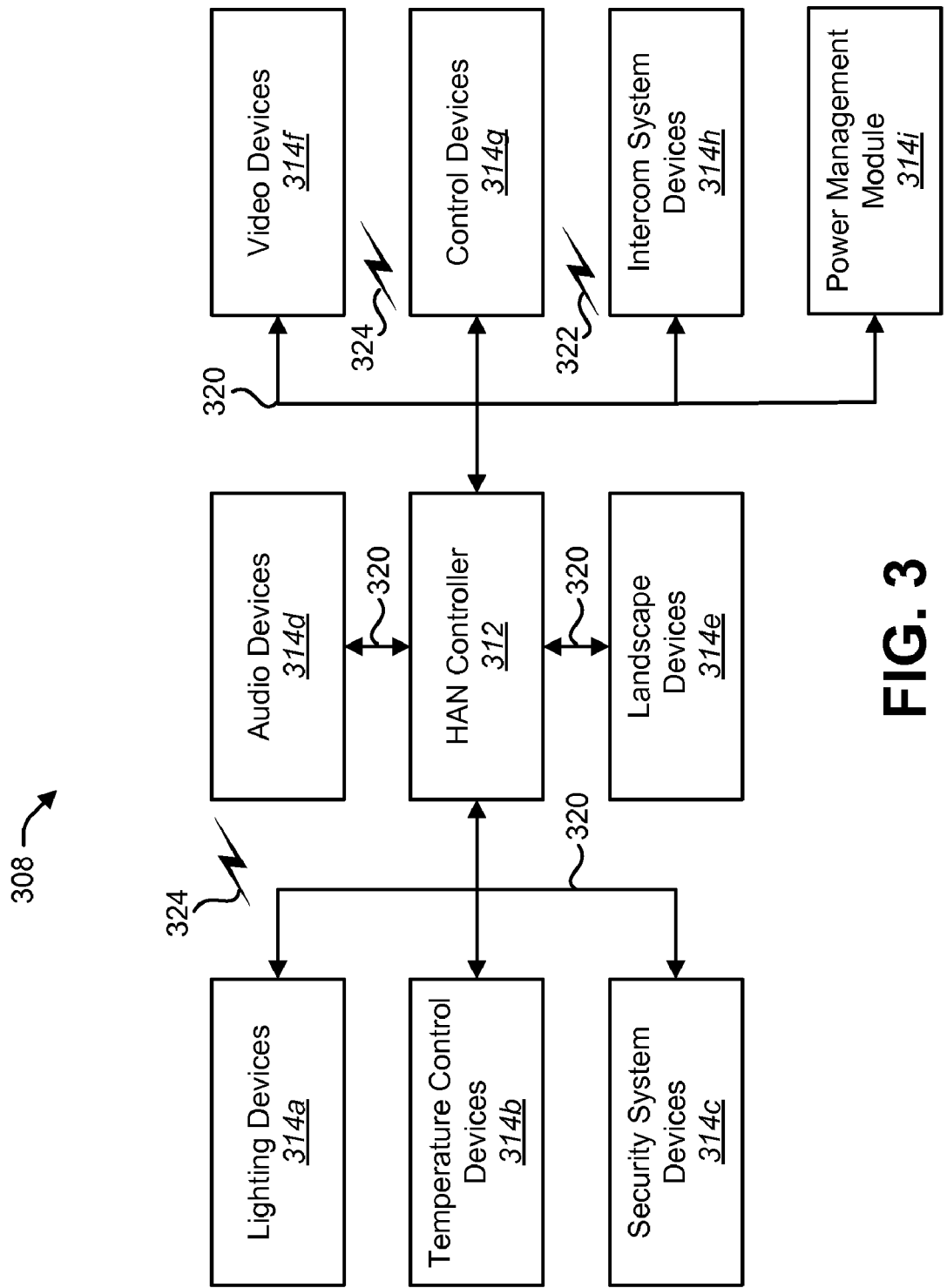
FIG. 3 is a block diagram illustrating a configuration of a home area network (HAN)

FIG. 3 is a block diagram illustrating one possible configuration of a HAN 308. The HAN 308 may include a HAN controller 312 and other HAN devices 314. The controller 312 may be in electronic communication with the devices 314. The HAN 308 may include multiple controllers 312, but typically requires that one of the controllers 312 is designated as the primary controller 312.

The controller 312 may be connected to the devices 314 via wireless or wired connections. In the present configuration, the controller 312 may be connected to the devices 314 via an Ethernet connection 320, a WiFi connection 322, a ZigBee connection 324, or a combination of the three. The controller 312 may be capable of communicating via these network connections, i.e. Ethernet 320, WiFi 322, ZigBee 324, or other type of connections.

The devices 314, in the present configuration, may include lighting devices 314a, temperature control devices 314b, security system devices 314c, audio devices 314d, landscape devices 314e, video devices 314f, control devices 314g, intercom system devices 314h, and a power management module 314i. Lighting devices 314a may include light switches, dimmers, window blinds, etc. Temperature control devices 314b may include thermostats, fans, fireplaces, and the like. Security system devices 314c may include security cameras, motion detectors, door sensors, window sensors, gates, or other security devices. Audio devices 314d may include AM/FM radio receivers, XM radio receivers, CD players, MP3 players, cassette tape players, and other devices capable of producing an audio signal. Landscape devices 314e may include sprinkler system devices, drip system devices, and other landscape related devices. Video devices 314f may include televisions, monitors, projectors, and other devices capable of producing a video signal. The control devices 314g may include touch screens, keypads, remote controls, and/or other control devices 314g capable of communicating with and/or controlling another device 314. Intercom system devices 314h may include intercom microphones, intercom related video devices, and other devices typically associated with an intercom system. The power management module 314i may include the actual control mechanism for the other devices 314. In other words, the power management module 314i may include the control functions that implement functionality for complying with requests for reduced power consumption.

Figure 4:
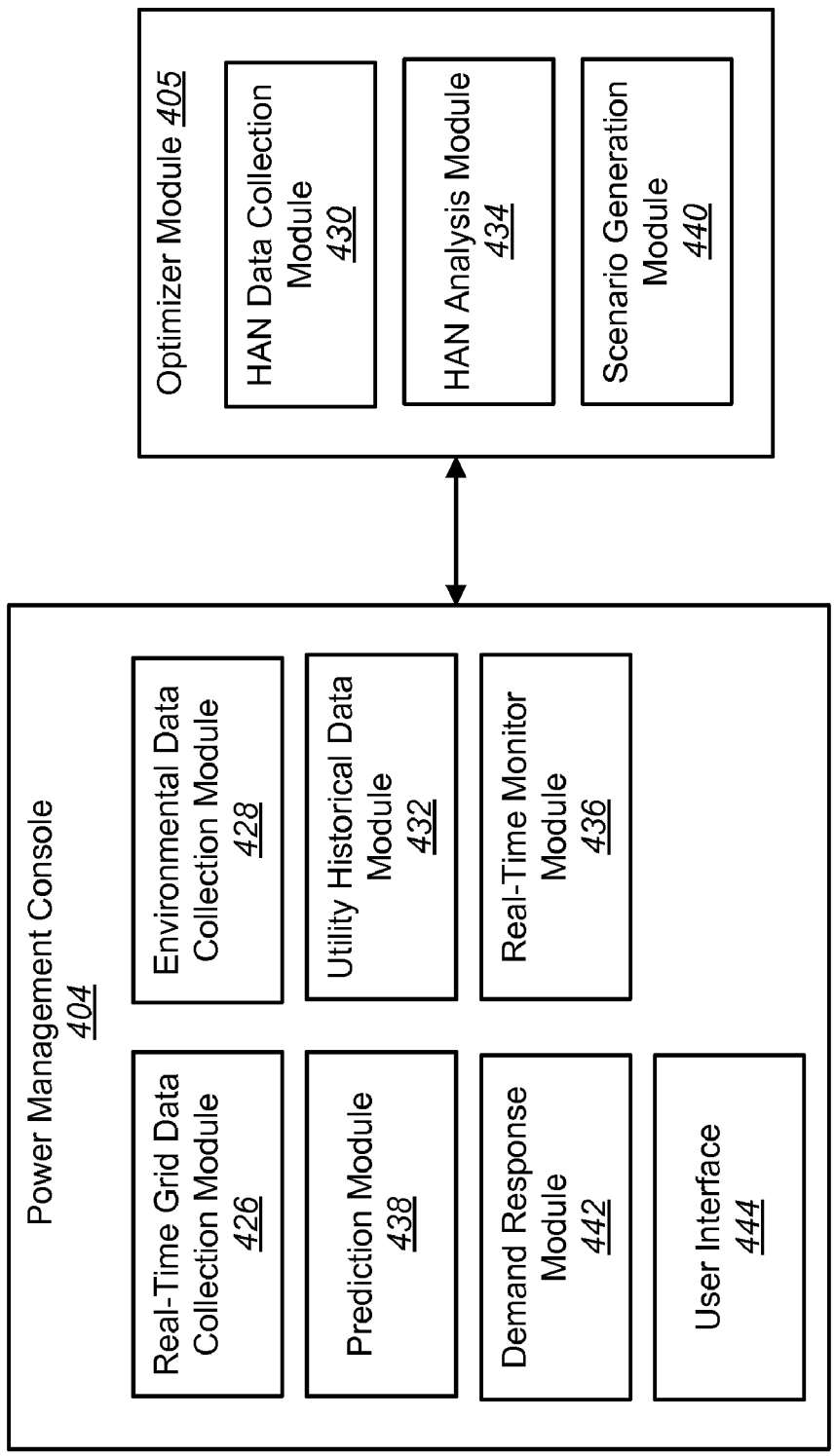
FIG. 4 is a block diagram illustrating one configuration of a power management console.

FIG. 4 is a block diagram illustrating one configuration of a power management console 404. The console 404 may be included on a power system 202 and may perform a variety of functions related to estimating the effects of a demand response sent by the power system 202. An optimizer console 405 may communicate with the power management console 404 and may supplement the data and functionality of the power management console 404. In one configuration, the power management console 404 may be used without the optimizer module 405. Then, the optimizer module 405 may be added later to allow the power management module 404 to estimate the effects of a request to change power usage. Among other functionality, the optimizer module 405 may integrate new HAN data with historical data, generate scenarios for reduction in power consumption with maximum revenue, calculate power reduction by geographic region, compare the expected performance versus actual performance, and revise the statistical model used to generate scenarios based on received data. Furthermore, the optimizer module 405 may be implemented using an application programming interface (API), a dynamic link library (DLL), a web services interface, etc.

Various modules in the console 404 may collect data that may be used to model the effects of a demand response. This data is described herein as being collected by distinct modules, although it is understood that the types of data collected by each module described may overlap with other data. The data described may be stored in the database 216 or in any other suitable storage inside or outside of the power system 202. Additionally, the modules described herein may be distinct as described and shown in FIG. 4 or may be combined in a different configuration.

A real-time grid data collection module 426 may collect current data about the amount of power being generated, including a distribution of how that power is being generated and how that power is being allocated at a given time. This module 426 may also collect data as to where there may be a source of stored power, such as a third-party power source, and where there may be a source of renewable power. In other words, this module 426 may generally determine the location and amount of power being generated and store this data in the database 216. An environmental data collection module 428 may obtain the historical, current, and forecasted temperatures and/or weather patterns for a geographic region, e.g., a zip code, and store this data in the database 216. This environmental data may be useful in modeling the effects of a demand response because heating or cooling may represent a large proportion of a HAN's 208 overall power consumption, particularly in extreme weather conditions.

A HAN data collection module 430 may obtain the current status/state, configuration, user preferences, and power usage of the each device 214 within one or more HANs 208 and store the data in the database 216. For example, the module 430 may collect the following types of data from a thermostat that controls a heating and cooling system:
(1) whether the heating and cooling system is currently ON or OFF;
(2) the heating and cooling system consumption (e.g., uses 4 kWh when in COOL mode and 3 kWh when in HEAT mode);
(3) time to make temperature changes (e.g., it will take 30 minutes to cool the home 1 degree);
(4) the user preferences (e.g., user will not allow the thermostat to raise the temperature above 78 degrees or below 66 degrees).

Likewise, the module 430 may collect the following types of data from an appliance controller that controls a dryer:
(1) ON/OFF state (e.g., the dryer is currently OFF);
(2) the dryer consumption (e.g., the dryer consumes between 2 kWh and 2.3 kWh depending on the load size, and the average load consumes 2.1 kWh at a rate of 2.5 kW);
(3) time to dry (e.g., the average dry time is 50 minutes);
(4) the user preferences (e.g., user will not allow the dryer to terminate a dry cycle that has already started).

Likewise, the module 430 may collect the following types of data from a lighting controller that controls a set of lights:
(1) ON/OFF state (e.g., the lights are currently OFF);
(2) the light consumption (e.g., the lights consume 2 kWh when the "Sunset" program is executed and 2.8 kW in the ON configuration);
(3) the user preferences (e.g., user will allow the lights to dim up to 70 percent in response to a demand response).

Likewise, the module 430 may collect the following types of data from an audio/visual controller that controls an audio/visual system:
(1) ON/OFF state (e.g., the system is currently OFF);
(2) consumption (e.g., the system consumes 1.2 kW when ON);
(3) the user preferences (e.g., user will allow any change to the system in response to a demand response).

Likewise, the module 430 may collect the following types of data from a pool controller that controls a pool:
(1) the current temperature (e.g., pool is 77 degrees);
(2) the set point (e.g., set point is 78 degrees);
(3) time to set point (e.g., it will take 1 hour to reach set point at this time of day with the current outside temperature);
(4) consumption (e.g., the pool will consume 4 kWh to reach the set point temperature);
(5) water filter cycle (e.g., the water filter cycles 1 hour ON, then 1 hour OFF);
(6) water filter consumption (e.g., the water filter consumes 500 W when ON);
(7) heater off to set point (e.g., if you turn the pool heater OFF for the next 4 hours, the resulting temperature is estimated to be 70 degrees, and it will take 2 hours and 8 kWh to reach the set point temperature);
(8) the user preferences (e.g., user will allow any changes to the pool temperature in response to a demand response).

While the configuration described includes a thermostat, a dryer, a lighting controller, an audio/visual controller, and a pool controller, it should be appreciated that data may be gathered by the HAN data collection module 430 for any type of device 214 within a HAN 208. Also, it should be appreciated that some or all of the data collected by the HAN data collection module 430 may first be collected by a HAN controller 212 and sent to the power management console 404 rather than being collected or determined first by the HAN data collection module 430.

Additionally, the power management console 404 may include a utility historical data module 432. This module 432 may collect a HAN 208 profile of power consumption, possibly in terms of average kWh per month. The module 432 may also collect the load shed available for each device 214 within the HAN 208, as well as historical demand response modes and participation by various devices 214 and HANs 208. For example, the module 432 may collect ON/OFF states from a thermostat that controls a heating and cooling system (e.g., last month the main floor heating and cooling system was ON 12 hours per day, and the second floor heating and cooling system was ON 14 hours per day).

Likewise, the module 432 may collect the following types of data from an appliance controller that controls a dryer:
(1) the average number of loads per week (e.g., 12 loads);
(2) load days (e.g., more loads are done on Saturdays and Sundays than other days);
(3) load times (e.g., most loads are run between 2 p.m. and 7 p.m.).

Likewise, the module 432 may collect the following types of data from a light controller that controls a set of lights:
(1) ON average (e.g., last month, the lights were ON for an average of 4.2 hours per day consuming 11.8 kWh);

(2) ON days (e.g., the lights are ON more on Saturdays and Sundays than other days).

Likewise, the module 432 may collect the following types of data from an audio/visual controller that controls an audio/visual system:
(1) ON average (e.g., last month, the system was ON for an average of 3.2 hours per day consuming 3.8 kWh);
(2) ON days (e.g., the system is ON more on Saturdays and Sundays than other days).

Likewise, the module 432 may collect the following types of data from a pool controller that controls a pool:
(1) pool use (e.g., the homeowner uses the pool an average of three times per week and typically between the hours of 4 p.m. and 7 p.m.).

The power management console may also include a HAN analysis module 434. This module 434 may determine the performance/health of HAN devices 214, determine analytics for the HAN 208 (such as whether the homeowner is on vacation), determine anticipated power consumption, and predicted effect of a demand response. This module 434 may also determine the overall neighborhood or region power consumption, the specific device power consumption in nearby HANs 208, and use this information to identify anomalies within a specific HAN 208, a neighborhood, or region. Additionally, the module 434 may also determine opportunities to reduce power consumption. Alternatively, these determinations may be made in the HAN controller 212 and sent to the console 434. For example, the module 434 may determine or collect the following types of data from a thermostat that controls a heating and cooling system:
(1) change for power reduction (e.g., changing the second floor set point to 78 degrees and the main floor set point to 76 degrees during the day would result in a 10 kWh reduction in power consumption);
(2) diagnostic symptoms and causes (e.g., the heating and cooling system is consuming approximately 3% more power than last week, so the air filter may need cleaning);
(3) percentage savings (e.g., changing the heating and cooling system to a unit with 95% efficiency will save $80 per year);
(4) AWAY set point savings (e.g., changing the AWAY set point up one degree during the next month will save $10 next month);
(5) FAN only temperature (e.g., running the FAN only when the outside temperature is 70 degrees or below will reduce the internal temperature by one degree);
(6) monthly comparisons (e.g., the heating and cooling system was 50% of the power bill last month, and is predicted to be 57% of next month's bill).

Likewise, the module 434 may determine or collect the following types of data from an appliance controller that controls a dryer:
(1) replacement savings (e.g., the Energy Guide Rating for this dryer is 420, and, based on the usage pattern, replacing the dryer with a rating of 480 will save $100 per year);
(2) diagnostic symptoms and causes (e.g., the dryer is consuming approximately 5% more than last week, so the lint filter may need cleaning or the vent may be obstructed);
(3) dryer cycle savings (e.g., changing the dryer cycle from a timed heat cycle to an auto dry cycle will save $50 next month);
(4) dryer total (e.g., the dryer averages 10% of the overall monthly power bill).

Likewise, the module 434 may collect the following types of data from a light controller that controls a set of lights:
(1) program usage and savings (e.g., last month the "Sunset" program ran for 150 hours and consumed 300 kWh, and terminating the program 45 minutes earlier will save $15 next month);
(2) light change savings (e.g., changing the light bulbs to compact fluorescent light bulbs will save $20 next month);
(3) light level savings (e.g., changing the maximum pre-set light level from 100% to 90% will save $10 next month);
(4) lighting total (e.g., lighting was 15% of the power bill last month, and is predicted to be 17% of next month's bill).

Likewise, the module 434 may collect the following types of data from an audio/visual controller that controls an audio/visual system:
(1) TV savings (e.g., changing the television backlight from 10 to 4 will save 80 Wh next month);
(2) audio/visual total (e.g., the audio/visual system was 10% of the power bill last month, and is predicted to be 12% of next month's bill).

Likewise, the module 434 may collect the following types of data from a pool controller that controls a pool:
(1) diagnostic symptoms and causes (e.g., the water filter is consuming 5% more power than last week, so the water filter may need cleaning);
(2) set point savings (e.g., lowering the set point by 2 degrees from 10:00 p.m. to 4:00 p.m. will result in a reduction of 4 kWh per day, and the set point will still be reached by 6:00 p.m.);
(3) pool total (e.g., the pool averages 10% of the overall monthly power bill).

The power management console 404 may also include a real time monitor module 436. This module 436 may create reports related to performance of the power system 202. For example, the real time monitor module 436 may use the data from the real time grid data collection module 426, among other modules, to represent the power generation and power consumption in a power grid. These reports may be filtered by device 214 attribute, device 214 type, or device 214 group, and may be displayed to a user of the console 404 via a user interface 444.

A prediction module 438 may predict the generation and consumption in a power grid in the future and suggest possible optimizations. For example, this may include predicting the generation capacity of one or more sources of power, e.g., wind, solar, nuclear, gas, coal, and predict the consumption over a time frame. This may include accounting for carbon credits and carbon offsets. These predictions may be compiled and presented in a usable form to a user via the user interface 444.

A scenario generation module 440 may determine and present various demand response scenarios to a user via a user interface 444. This may include determining, based on the data collected by the various modules, the reduction in consumption if a particular demand response was sent. For example, a user may want to estimate the effects of sending a demand response to 10,000 HANs 208 to reduce their heating and cooling power consumption by five percent. Based on the data collected, the console 404 may determine the actual load reduction that would result if such a demand response were sent. Alternatively, a user may want to estimate the effects of an emergency demand response, so that the power system 202 may be better able to efficiently deal with an actual emergency. Alternatively, still, a user may want to estimate the effects of a demand response for the purpose of provisioning a load on a grid to another branch of the grid so that maintenance or repairs may be performed. Alternatively still, a user and a power system 202 may desire to maximize their revenue by selling their surplus power generation capacity to another region. For example, a user may estimate the effects of a demand response in order to determine that some reduction in consumption could be achieved, after which the power system 202 may reallocate the surplus generation capacity for a higher price to another region. All of these scenarios may be presented to a user via the user interface 444.

A demand response module 442 may be responsible for actually issuing demand responses, or alerts and alarms, from the power system 202. These demand responses may be sent on demand by a user or scheduled at a defined interval for peak event management. It should be noted that the demand response may not actually be sent even though the scenarios for it may be generated.

The user interface 444 may be capable of receiving input from a user and presenting information to the user of the console 404. For example, the user interface 444 may present graphs, charts, text, pictures, videos, etc. about the generation and consumption of power on a power grid. The generation and consumption may be broken down by types of generation and types of devices 214, respectively. Additionally, the user interface may present regional information about a power grid on a map e.g., areas affected by a power outage or consumption. For example, the user interface 444 may show areas that are affected by a power outage using maps available on the Internet (e.g., Google Maps, Mapquest, Yahoo! Maps, etc.).

Figure 5:
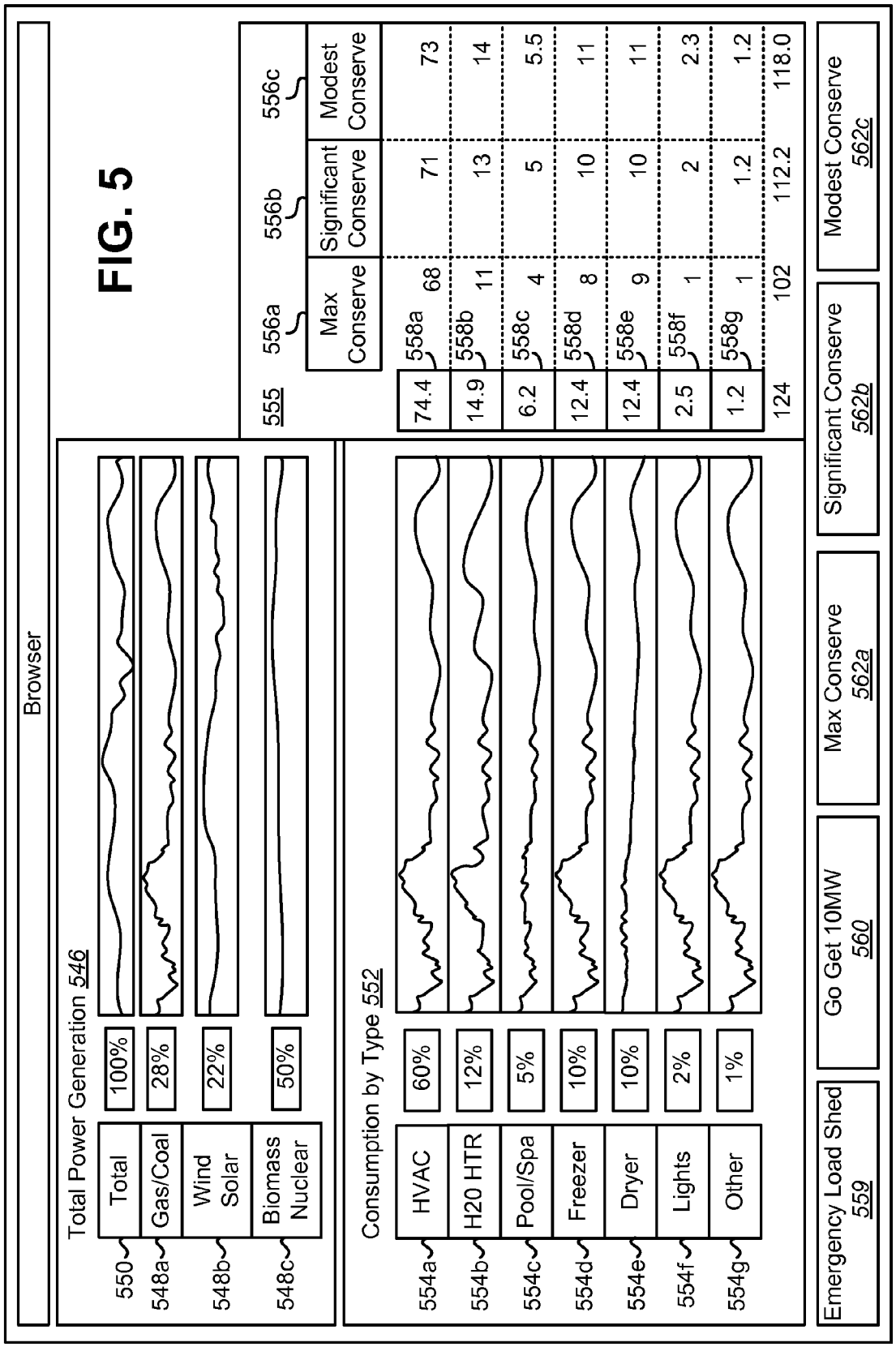
FIG. 5 is a block diagram illustrating one configuration of a screenshot on the power management console.

FIG. 5 is a block diagram illustrating one configuration of a screenshot on the power management console 204. This screenshot may represent the output of the user interface 444 on the power management console 204. There may be a total power generation window 546 that displays one or more power generation waveforms as functions of time. For example, the generation window 546 may display a total power generation waveform 550 that indicates the total power generation of the power system 202. The total waveform 550 may be a composite of the different types of power being generated, e.g., the gas and coal waveform 548a, the wind and solar waveform 548b, and the biomass and nuclear waveform 548c. The total power generation window 546 may also display the percentage that each type of power generation source represents in the total power generation of the power system 202. In the configuration shown, the gas and coal power generation represents 28% of the total generation, the wind and solar power generation represents 22% of the total generation, and the biomass and nuclear power generation represents 50% of the total generation.

The user interface 444 may also output a consumption window 552 that displays one or more power consumption waveforms as functions of time. For example, the consumption window 552 may display a waveform 554 for every type of device 214 consuming power from the power system 202, e.g., an HVAC waveform 554a, a hot water heater waveform 554b, a pool and spa waveform 554c, a freezer waveform 554d, a dryer waveform 554e, a lights waveform 554f, and an other waveform 554g. The consumption window 552 may also display the percentage that the consumption for each type of device represents of the total power consumption. In the configuration shown, consumption by HVAC devices represents 60% of total consumption, consumption by hot water heaters represents 12% of total consumption, etc.

The user interface may also output a scenario grid 555 that displays the estimated effects of one or more demand responses. The grid 555 may display the total rate 558 at which power is presently being consumed by each device type. In the configuration shown, the HVAC devices are consuming 74.4 MW, the hot water heaters are consuming 14.9 MW, the pools and spas are consuming 6.2 MW, etc. The grid may also display one or more scenarios 556 for reduced power consumption, where a scenario 556 may be represented by a column in the grid 555. In the configuration shown, the max conserve scenario 556a would reduce the consumption by HVAC devices from 74.4 MW to 68 MW, the consumption by hot water heaters from 14.9 MW to 11 MW, the consumption by pools and spas from 6.2 MW to 4 MW, etc. Likewise, the significant conserve scenario 556b would reduce the consumption by HVAC devices from 74.4 MW to 71 MW, the consumption by hot water heaters from 14.9 MW to 13 MW, the consumption by pools and spas from 6.2 MW to 5 MW, etc. Likewise, the modest conserve scenario 556c would reduce the consumption by HVAC devices from 74.4 MW to 73 MW, the consumption by hot water heaters from 14.9 MW to 14 MW, the consumption by pools and spas from 6.2 MW to 5.5 MW, etc. There may be more or less than the three scenarios 556 shown in the grid 555. Additionally, the grid 555 may display the financial impact (not shown) of each scenario 556. For example, the grid may display the total change in income for the power system 202 based on the price charged per kWh and the change in consumption for each scenario 556. This may enable the power system 202 to use the console 204 to maximize revenue.

The user interface may also provide one or more buttons that send a demand response to various HANs 208. For example, there may be a 10 MW button 560, which may prompt the power management console 404 to send a demand response tailored, based on the data collected, to reduce power consumption by 10 MW. Additionally, there may be scenario buttons 562 that may prompt the power management console 404 to send a demand response tailored to mirror the corresponding scenario 556 generated. In other words, the max conserve scenario button 562 may prompt the console 404 to send a demand response to achieve the reduction in consumption reflected in the max conserve scenario 556. There may also be an emergency load shed button 559 that may prompt the console 404 to send a demand response that overrides any device 214 preferences and sheds some or all of a device 214 load. For example, if critical services, such as emergency responders and hospitals do not have enough power, this type of demand response may be sent.

Figure 6:
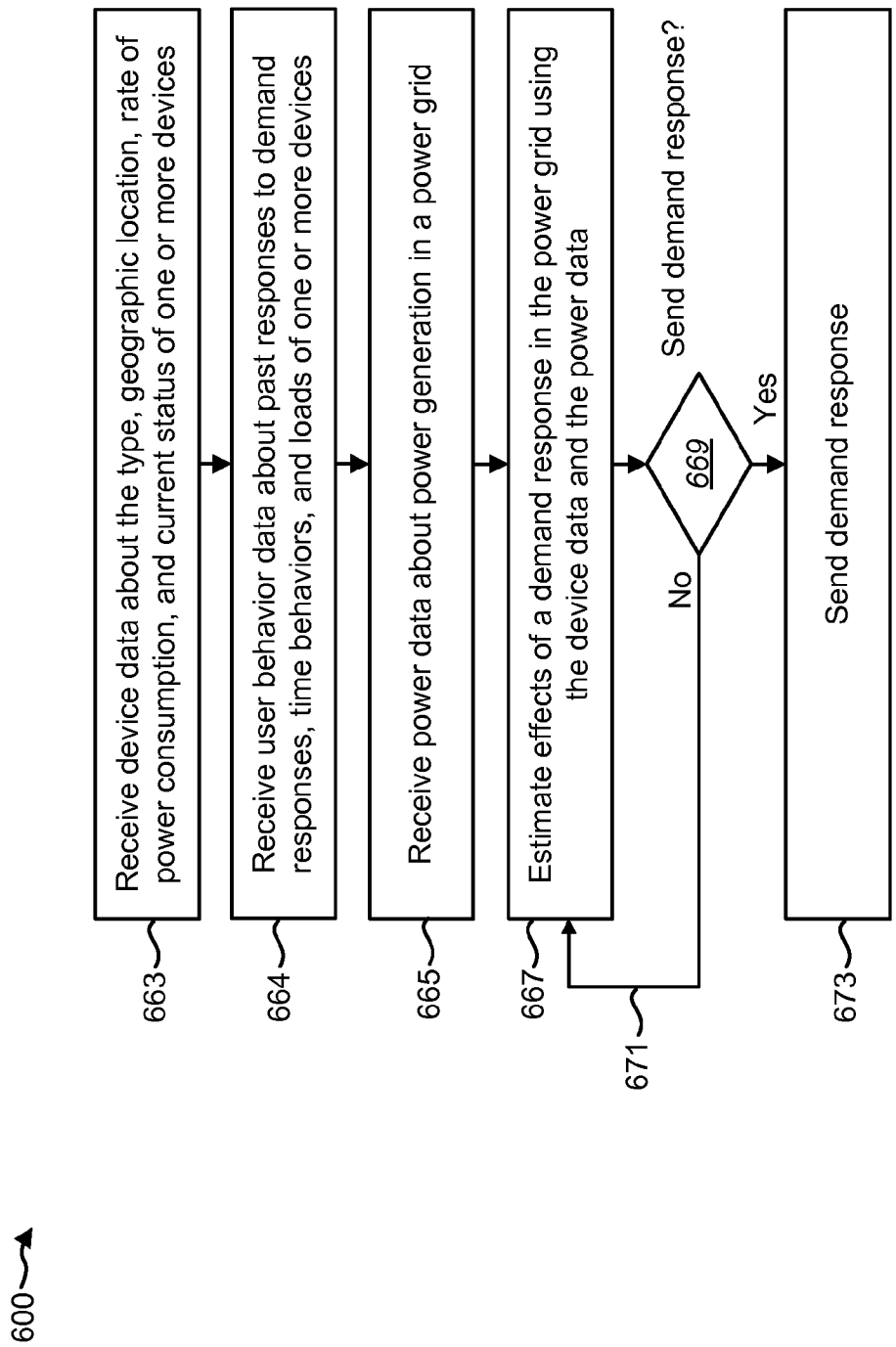
FIG. 6 is a flow diagram illustrating a method for estimating the effects of a demand response.

FIG. 6 is a flow diagram illustrating a method 600 for estimating the effects of a demand response. The method 600 may be executed on a power management console 204 on a power system 202. The console 204 may receive 663 device data about one or more devices 214. This device data may include the type, current status, power consumption, geographic location of the devices, etc. This device data may also include other types of information and may be received from a HAN controller 212 or from the devices 214 themselves. The console 204 may also receive 664 user behavior data about one or more devices 214. This user behavior data may include past responses to demand responses, time behaviors, loads of the devices, etc. The console 204 may also receive 665 power data about power generation in a power grid. The power data may include the amount and types of power being generated, the current and forecasted temperature of geographical regions consuming the power, the price of the power in the different regions consuming the power, and/or the amount and type of available stored power in the power grid. The console 204 may then estimate 667 the effects of a demand response in the power grid using the device data and the power data. This may produce scenario 556 that displays the amount of reduction in power consumption and where that reduction may come from. This type of estimation may allow a power system 202 to accurately know the results of a demand response before it is sent, even if the demand response is never sent. After estimation 667, the console 204 may then determine 669 whether to send the demand response. This determination 669 may depend on whether the scenario 556 acceptably reduces consumption to meet the goals of the power system 202. The goals of the power system 202 may include reducing consumption because there is not enough generation, reducing consumption to sell the excess generation in order to maximize revenue, reducing consumption to reallocate loads in order to repair infrastructure, etc. If the console determines that the estimated demand response should not be sent 671, the console 204 may estimate the effects of a different demand response. If the console 204 determines that the estimated demand response should be sent, the console may send 673 the demand response to the intended recipients. The method shown in FIG. 6 may repeat as needed.

Figure 7:
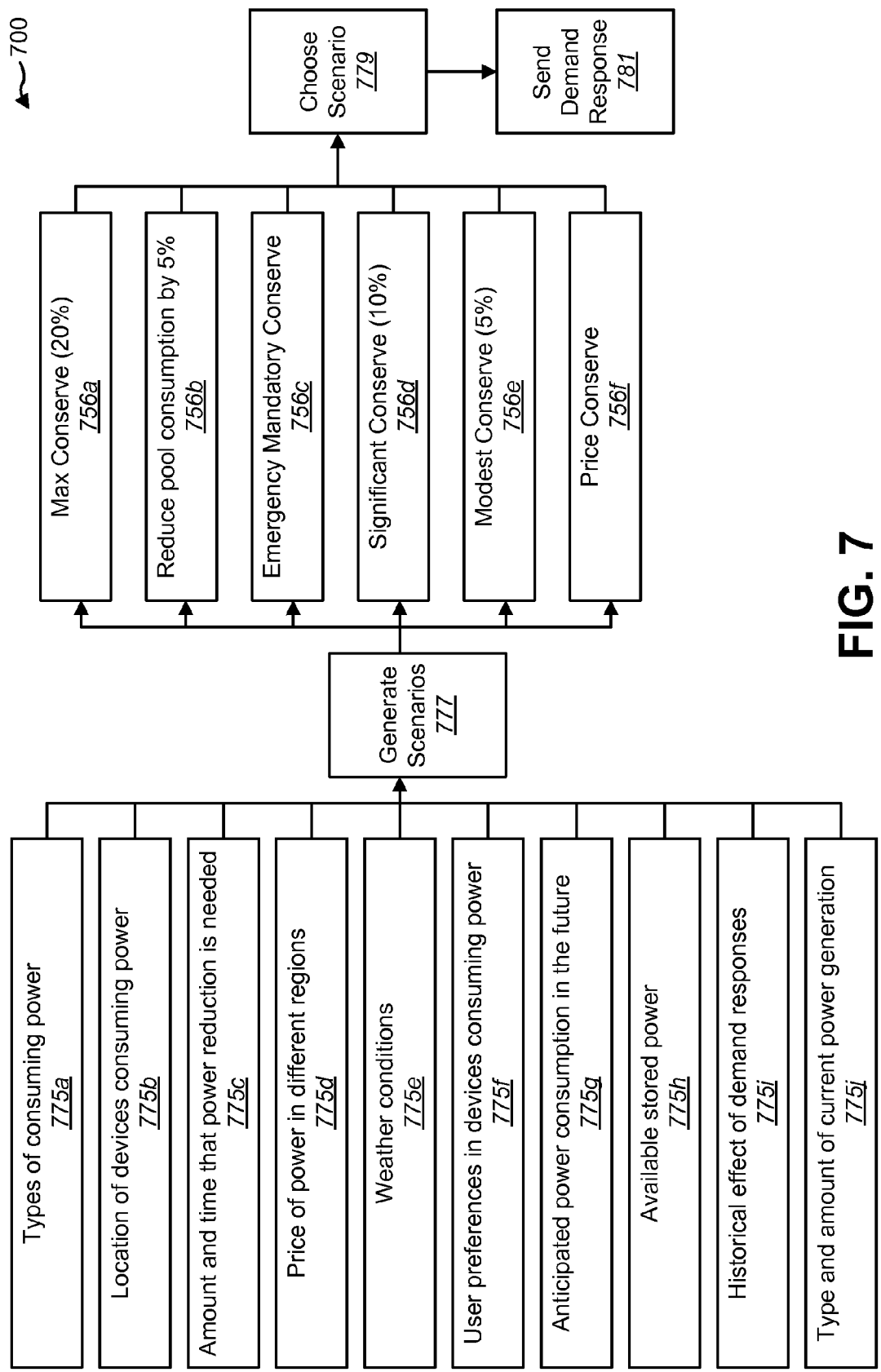
FIG. 7 is a flow diagram illustrating another method for estimating the effects of demand responses.

FIG. 7 is a flow diagram illustrating another method 700 for estimating the effects of demand responses. In the method 700, multiple scenarios 756 may be generated simultaneously in a power management console 204 and a user of the console 204 may select from among them. In other words, this method 700 may correspond to steps 667-673 in the method 600 of FIG. 6.

The console may first receive data 775 about devices 214, the power grid, environmental conditions, etc. This data may include the types of devices consuming power 775a, the location of devices consuming power 775b, the amount and time that power reduction is needed 775c, the price of power in different regions of the power grid 775d, weather conditions 775e, user preferences in devices consuming power 775f, anticipated power consumption in the future 775g, available stored power 775h, the historical effect of demand responses 775i, and the type and amount of current power generation 775j. It should be noted that many other factors may be used by the console 204. The console may then generate 777 scenarios 756 based on the data 775. The scenarios 756 may include max conserve scenario 756a where the demand response reduces total consumption by 20%, a reduce pool consumption by 5% scenario 756b, an emergency mandatory conserve scenario 756c, a significant conserve scenario 756d where the demand response reduces total consumption by 10%, a modest conserve scenario 756e where the demand response reduces total consumption by 5%, and a price conserve scenario 756f. The price conserve scenario 756f may be a demand response that informs devices 214 that the price of power will be raised to a certain level for a given time period and then allows the devices 214 to determine whether to reduce consumption based on user preferences or user input.

After the scenarios 756 have been generated 777, the console 204 may choose 779 a scenario and then send 781 a demand response based on the chosen scenario 756. The determination of the specific scenario 756 to select may be made by the console 204, by a user at the console 204, or through a combination of automated selections by the console 204 with specific points for user input. The scenario 756 may be selected based on repairs needed to the power grid, maximizing revenue, etc. Alternatively, no scenario 756 may be chosen 779 or sent 781. In this case, the console 204 merely models the scenarios 756, but does not send a corresponding demand response.

Figure 8:
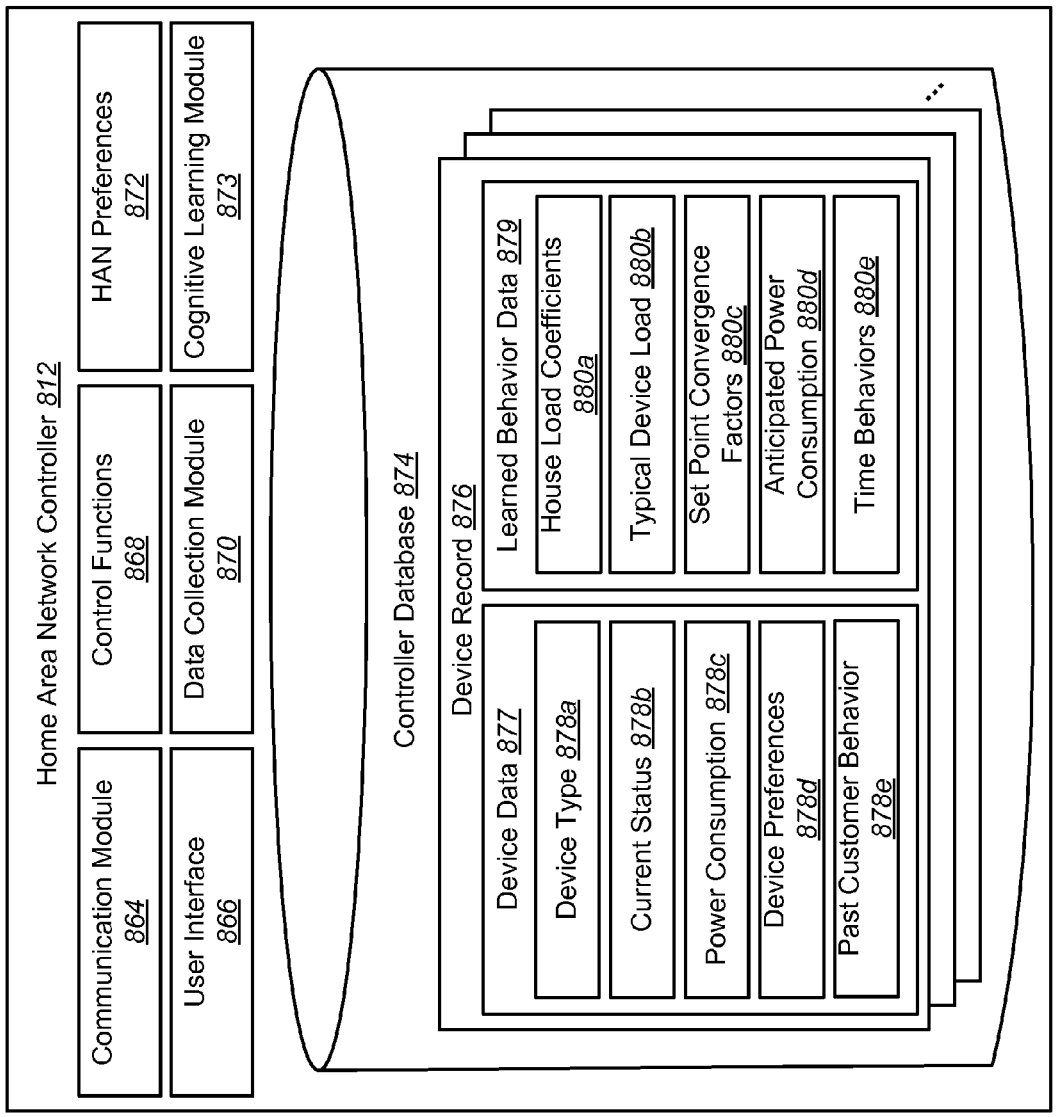
FIG. 8 is a block diagram of a HAN controller.

FIG. 8 is a block diagram of a home area network controller 812. The controller 812 may include a communication module 864 that may communicate with a power system 202, a utility meter 210, HAN devices 214, or some combination of the three. The controller 812 may communicate with other devices 214 using various methods including, but not limited to, an infrared (IR) connection, an Ethernet connection, a wireless connection using the 802.11g (WiFi) standard, a wireless connection using the 802.15.4 (ZigBee) standard, or other wired or wireless connections. Alternatively, there may be more than one controller 812 for a HAN 208 or there may not be a controller 812 for a HAN 208. Furthermore, the communication module 864 may efficiently pack any data sent from the HAN controller 812 for transmission. In one configuration the WAN 206a over which the HAN controller 812 communicates with the power system 202 may have low transmission capacity. Therefore, the communication module 864 may pack data sent to the power system 202 in such a way so as to avoid wasting bandwidth on the WAN 206a.

The controller 812 may also include a user interface 866 that allows a user to view and change HAN preferences 872, configurations, and power consumption. The user interface 866 may display data in the form of charts, graphs, waveforms, etc. and may receive input from users in a variety of ways. For example, the user interface 866 may display a customizable power consumption report showing the consumption within the HAN 208 for a defined period of time, the cost associated with that power consumption, and recommendations for reducing the cost in the future.

The controller 812 may include control functions 868 for one or more devices 214. Control functions 868 may include instructions that control the operation of devices 214. For example, a control function 868 may change the set point on a thermostat, change the setting on a light controller to ON, change the heat setting on a dryer, etc. It should be appreciated that these control functions 868 may not be the only means of controlling the devices 214 on the HAN 208. In other words, a user may also change the set point on a thermostat using the thermostat or turn the lights ON using the light controller in addition to using the HAN controller 812.

The HAN controller 812 may also include a data collection module 870 that collects data about the HAN 208 generally and each device 214 in the HAN 208. This data may overlap with the data collected by the power management console 404. Specifically, some or all of the data collected by the HAN data collection module 430 may be collected by the HAN controller 812 first and then sent to the power management console 404. In other words, the data collection module 870 may obtain the current status/state, configuration, and power usage of the each device 214 and store the data in the controller database 874. The data collection module 870 may also collect data about the historical power consumption of one or more devices 214 that may be used to assess the health of the device, e.g. if the dryer is consuming 5% more power than last week, the lint filter may need cleaning. All of this data may then be sent to the HAN data collection module 430 in the power management console 404 to estimate the effects of a demand response.

The HAN controller 812 may also include HAN preferences 872 that may be defined by a user of the HAN 208. These HAN preferences 872 may be groups of settings, or a profile, which affect the entire HAN 208 or part of the HAN 208. For example, a user might have a vacation setting where the heating and cooling system is turned OFF, the lights are set to OFF, the pool temperature set point is raised, etc. Likewise, there may be one or more conservation settings where the inside temperature set point is raised or lowered depending on the outside temperature, the lights are set to 80%, and the pool temperature set point is lowered. Likewise there may be a night time setting where the inside temperature set point is raised or lowered depending on the outside temperature, the outside lights are set to OFF, and the pool temperature set point is lowered. These HAN preferences 872 may also specify general preferences as to power consumption. For example, a user may specify that they are willing to pay for their needs at any cost, so the power consumption should not be reduced in any device unless a mandatory emergency demand response is received. Additionally, a user could specify that all demand responses should be fully complied with, or that demand responses relating to certain device 214 types should be complied with. The HAN preferences may also specify that certain actions should be taken when the price of power exceeds a predefined threshold. For example, the inside temperature should be set to 75 degrees or higher during summer months when the price of power exceeds $0.15 per kWh. As before, these HAN preferences 872 may be collected or determined by the controller 812 and may also be sent to the HAN data collection module 430 in the power management console 404 to estimate the effects of a demand response.

The HAN controller 812 may also include a controller database 874 that includes device records 876 that include device data 877 and learned behavior data 879 about the devices 214. The device data 877 may include data about the current and past status of the devices 214. For example, device data 877 may include, without limitation, the device type 878*a*, current status/state 878*b* of the device, current power consumption 878*c*, device preferences 878*d*, and past customer behavior 878*e* for the device 214. The past customer behavior 878*e* may be data relating to the actual response of the device 214 to past demand responses, e.g., whether the device overrides demand responses and under what circumstances or price of power. The learned behavior data 879 may be data that has been collected and further processed by the cognitive learning module 873. In other words, the learned behavior module 879 may be data that is derived from device data 877 or other observation of the device 214. For example, the learned behavior data 879 may include, without limitation, load coefficients for a home 880*a*, the typical device load 880*b*, set point convergence factors 880*c* for devices such as an HVAC system, anticipated power consumption 880*d* in the future, and time behaviors 880*e*, e.g., the time of day during which the device 214 typically enters various states. The house load coefficients 880*a* may be data relating to the base load of the home, e.g., the power consumption of the home independent of the device 214. Both the device data 877 and the learned behavior data 879 may be sent to the power management console 404 and used to estimate the effects of a demand response.

Figure 9:
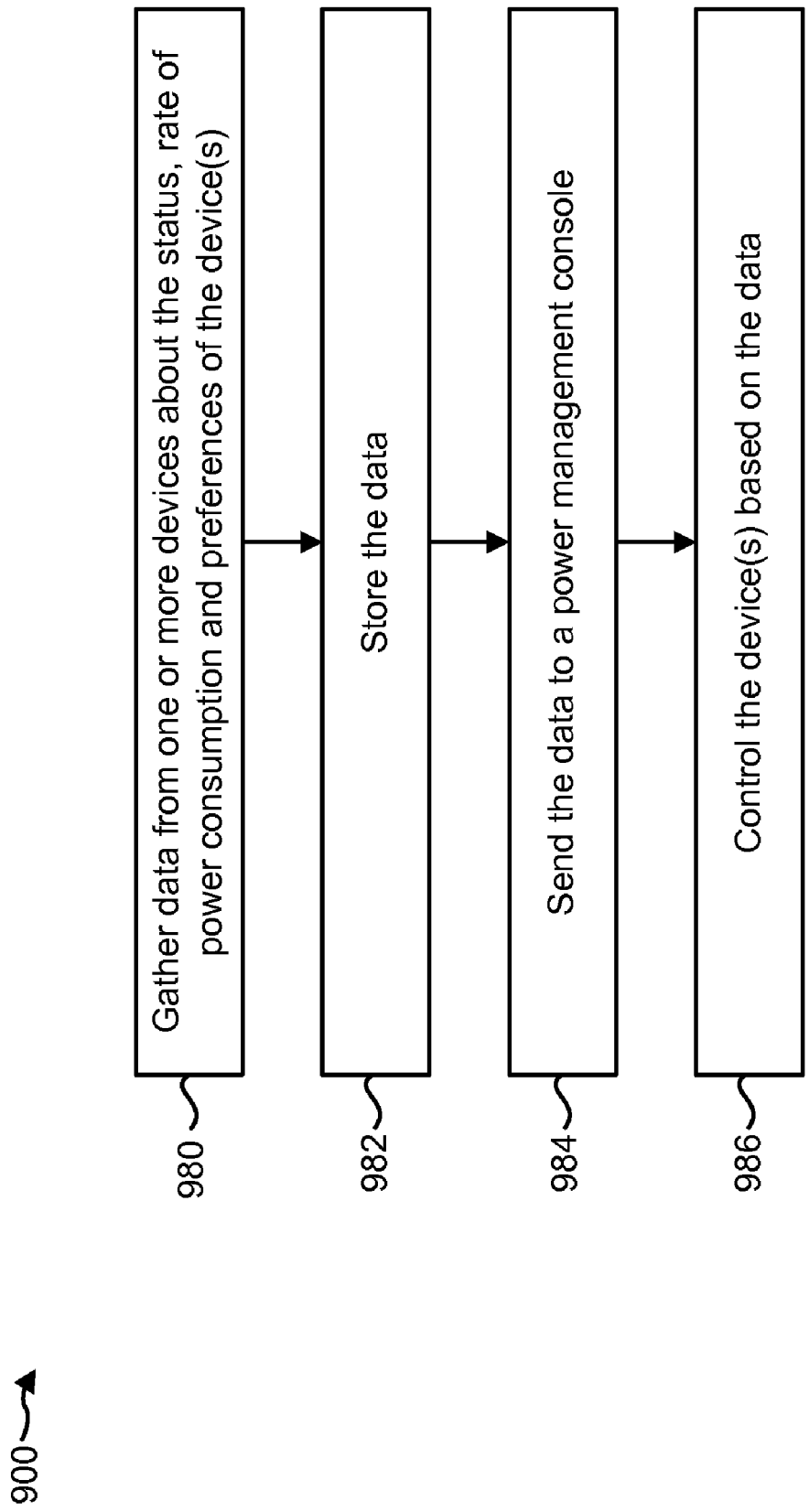
FIG. 9 is a flow diagram illustrating a method for controlling a device using a HAN controller.

FIG. 9 is a flow diagram illustrating a method 900 for controlling a device 214 using a HAN controller 212. The controller 212 may gather 980 data from one or more devices 214 about the status, power consumption, and preferences of the device(s) 214. This may include communicating with the devices 214 using the ZigBee protocol and may include communicating with a utility meter 210, a power system 202, HAN devices 214, and/or receiving input from a user of the controller 212. The controller 212 may then store 982 the data in a controller database 874 and send 984 the data to a power management console 204. The console 204 may then use this data to estimate the effects of a demand response. Lastly, the controller 212 may control 986 the devices 214 based on the data. For example, if the data specifies that the vacation setting is ON, then the devices may be adjusted accordingly, e.g., the heating and cooling system set to OFF, the lights set to OFF, etc.

Figure 10:
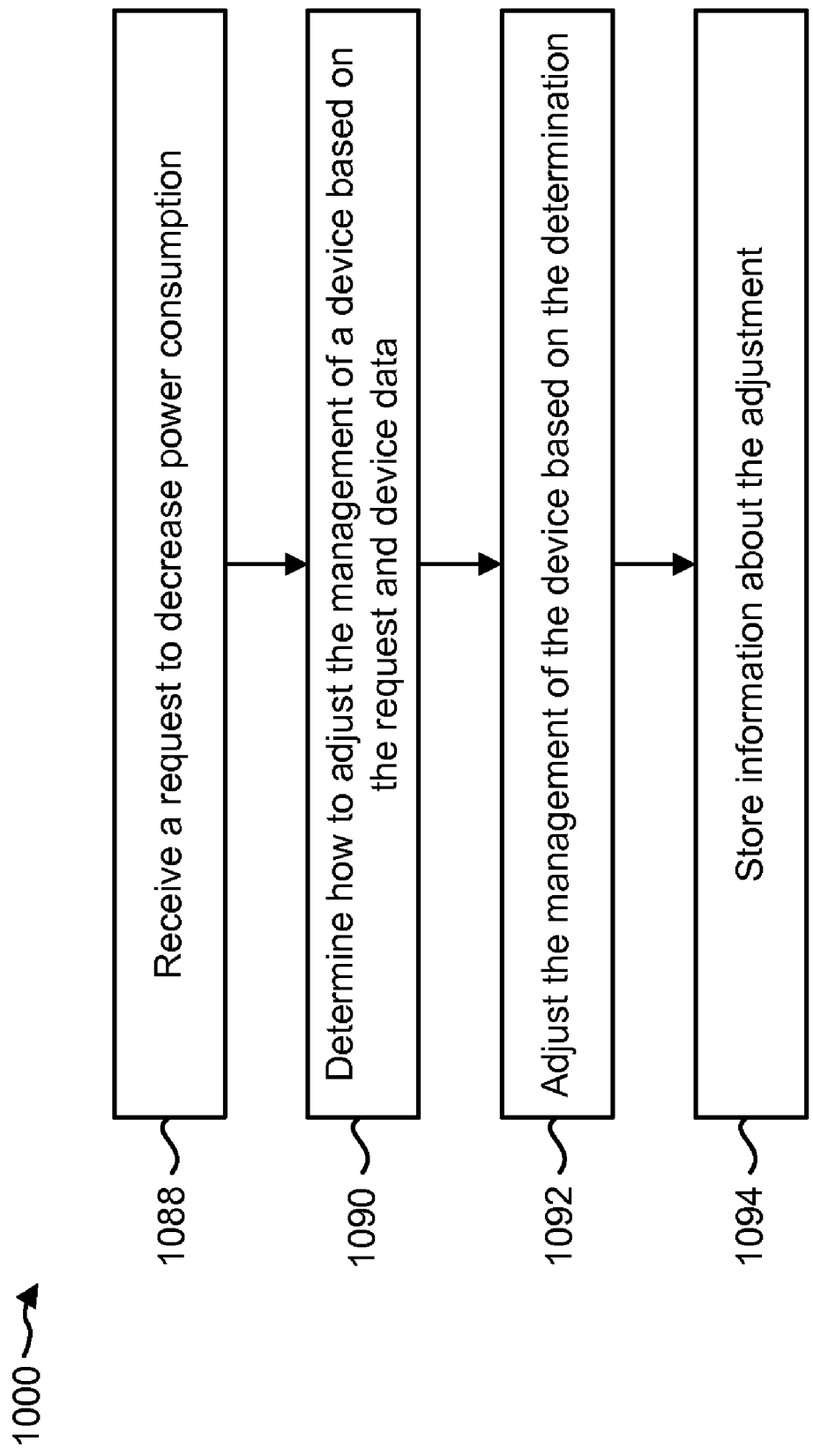
FIG. 10 is a flow diagram illustrating a method for adjusting the control of a device using a HAN controller.

FIG. 10 is a flow diagram illustrating a method 1000 for adjusting the control of a device 214 using a HAN controller 212. The controller 212 may receive 1088 a request to decrease power consumption in one or more devices 214. This request may be a demand response sent from a power system 202 or may be user input, e.g., a user setting the vacation setting ON. The controller 212 may then determine 1090 how to adjust the management of a device 214 based on the request and device data, which may be stored on a controller database 874. The device data may include the status/state 878*b* of the device 214, power consumption 878*c*, device preferences 878*d*, anticipated power consumption 878*e* of the device 214, etc. In some cases, determining 1090 may be as simple as complying with the request. In other cases, however, determining 1090 may include determining what action to take, if any. For example, if a demand response requests a reduction of 5% in power consumption by all heating and cooling systems, the controller 212 may have to determine if this is possible. The controller 212 may use device data from the thermostat to determine whether the heating and cooling system is turned ON and whether the user preferences will allow this type of reduction. If the heating and cooling system is turned ON and preferences allow it, then the controller 212 may have to determine how to reduce power consumption by 5%. One option might be to change the inside temperature set point higher or lower. Another option might be to turn the heating or cooling element off all together, but leave the fan running. Still another option might be to turn certain heating and cooling zones OFF that are unoccupied while leaving occupied zones unchanged. The controller 212 may then adjust 1092 the management of the device 214 based on the determination. In some cases, the determination might be to do nothing, e.g., if user preferences do not allow the reduction in response to an optional demand response. In other cases, the adjustment 1092 may include using control functions 868 to make a change to the device 214. Lastly, the controller 212 may store 1094 the information about the adjustment. This stored information may later be used by the power management console 204 to estimate the effects of a demand response or by the controller 212 to assess the health of the device 214.

Figure 11:
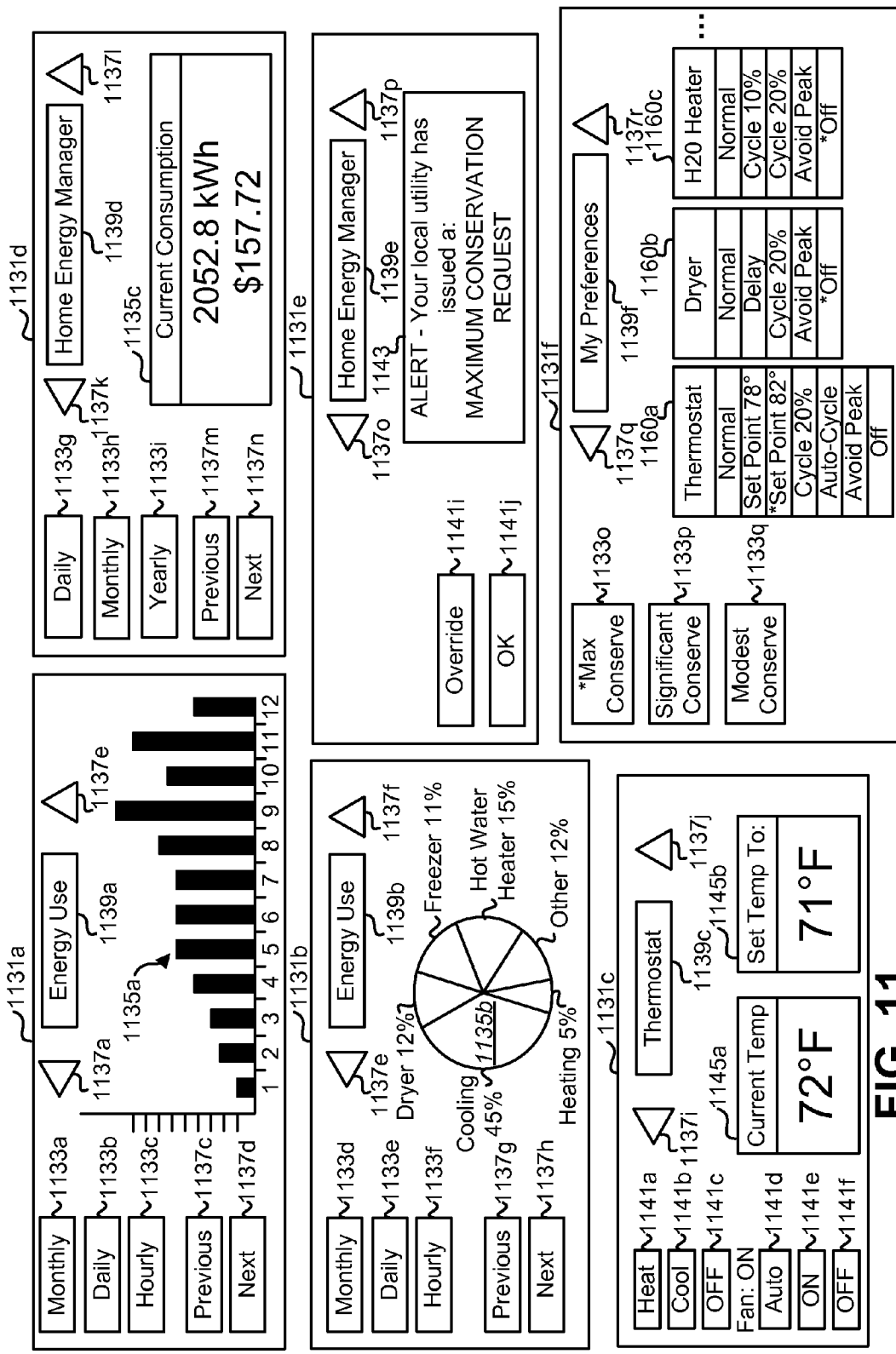
FIG. 11 is a block diagram illustrating multiple configurations of a screenshot on the HAN controller.

FIG. 11 is a block diagram illustrating multiple configurations of possible screenshots 1131 on a HAN controller 212. The controller 212 may include a display that receives input from a user via touchpad, buttons, keyboard, etc. or the controller 212 may be connected to a separate display, e.g., a television or computer monitor. Each screenshot 1131 may include configuration buttons 1133 that may configure the displayed data 1135. For example, a user may choose a monthly, daily, or hourly view of their energy use in bar graph form 1135*a*, pie chart form 1135*b*, or raw numbers 1135*c*. Each display may also include navigation buttons 1137 that allow the user to navigate between views. For example, a user may switch the view between overall energy use 1139*a*, 1139*b*, device views 1139*c*, and a home energy manager 1139*d*, 1139*e*. The display may also include control buttons 1141 that change settings within a device 214 or a HAN 208. For example, using the control buttons 1141, a user may turn the thermostat to heat 1141*a*, cool 1141*b*, OFF 1141*c*, or adjust the temperature set point 1145*b* up or down and may turn the fan to auto 1141*d*, ON 1141*e*, or OFF 1141*f*. Additionally, the display may also notify a user of any alerts 1143, such as received demand responses and allow them to override 1141*i* or comply 1141*j* with the alert 1143. Likewise, the display may also include device specific data, such as the current temperature 1145*a* and the current temperature set point 1145*b* for a thermostat 1139*c*.

Additionally still, the controller 212 may display and change the user preferences 1160 for one or more HAN devices 214 using the configuration buttons 1133. For example, in response to a maximum conserve demand response, the user may choose to change the set point on the thermostat to 82 degrees, turn the dryer OFF, and turn the hot water heater OFF. Thus, when a maximum conserve demand response is received, the controller 212, or the device 214 itself, may use the device preferences 1160 to control the device 214 in a manner that complies with the demand response. This may include changing the demand response from an objective to a directive. Device preferences 1160 may be created for many different types of demand responses and HAN devices 214.

Figure 12:
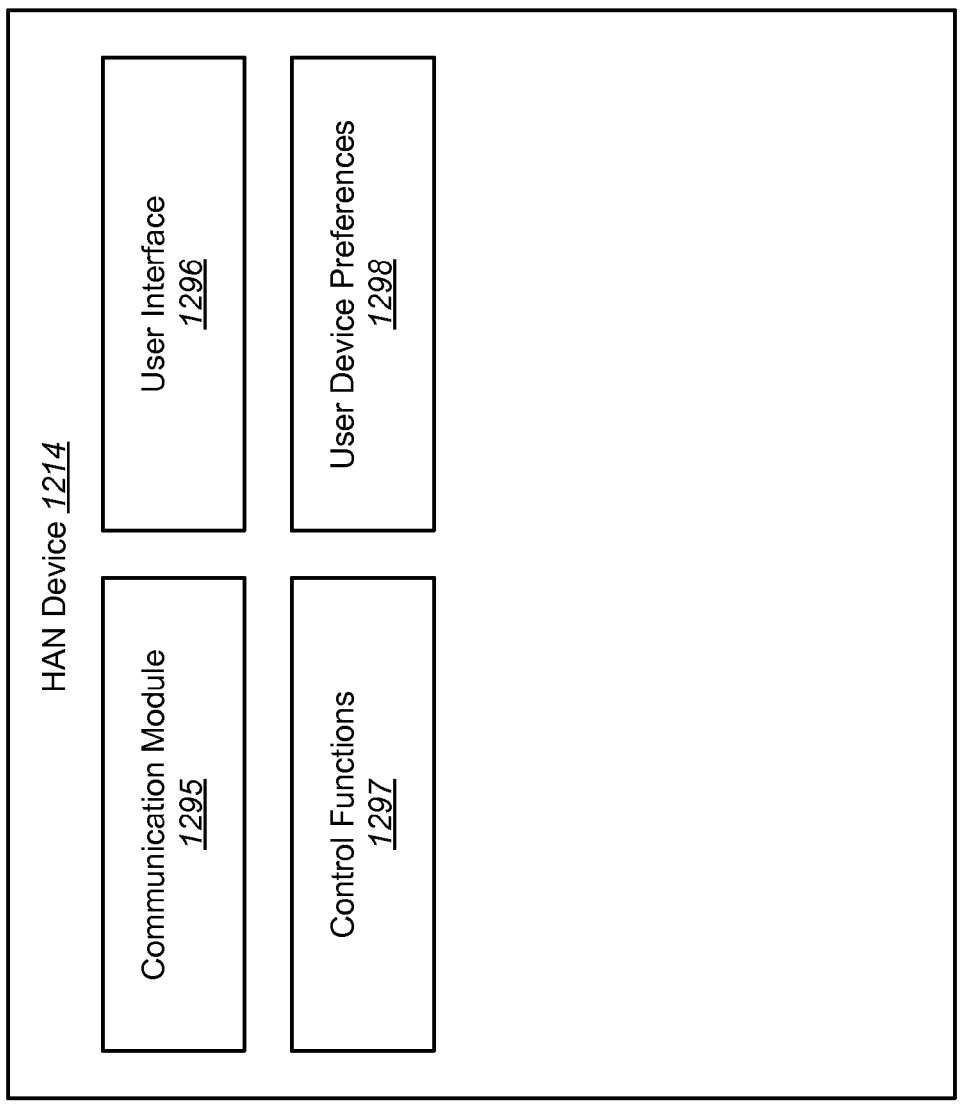
FIG. 12 is a block diagram of a HAN device.

FIG. 12 is a block diagram of a HAN device 1214. The device 1214 may include a communication module 1295 that may communicate with a power system 202, a utility meter 210, HAN controller 212, or some combination of the three. The device's communication module 1295 may communicate with other devices 214 using various methods including, but not limited to, an infrared (IR) connection, an Ethernet connection, a wireless connection using the 802.11g (WiFi) standard, a wireless connection using the 802.15.4 (ZigBee) standard, or other wired or wireless connections. The device 1214 may also include a user interface 1296 that allows a user to view and change device preferences 1298, configurations, and power consumption. The user interface 1296 may display data in the form of charts, graphs, waveforms, etc. and may receive input from users in a variety of ways. For example, the user interface 866 may display a customizable power consumption report showing the consumption within the device 1214 for a defined period of time, the cost associated with that power consumption, and recommendations for reducing the cost in the future.

The device 1214 may also include control functions 1297. Control functions 1297 may include instructions that control the operation of the device 1214. For example, a control function 1297 may change the set point on a thermostat, change the setting on a light controller to ON, or change the heat setting on a dryer. It should be appreciated that these control functions 1297 may not be the only means of controlling the device 1297. In other words, HAN controller 212 may also change the set point on a thermostat or turn the lights ON in addition to using the control functions 1297 on the device 1214 itself.

Figure 13:
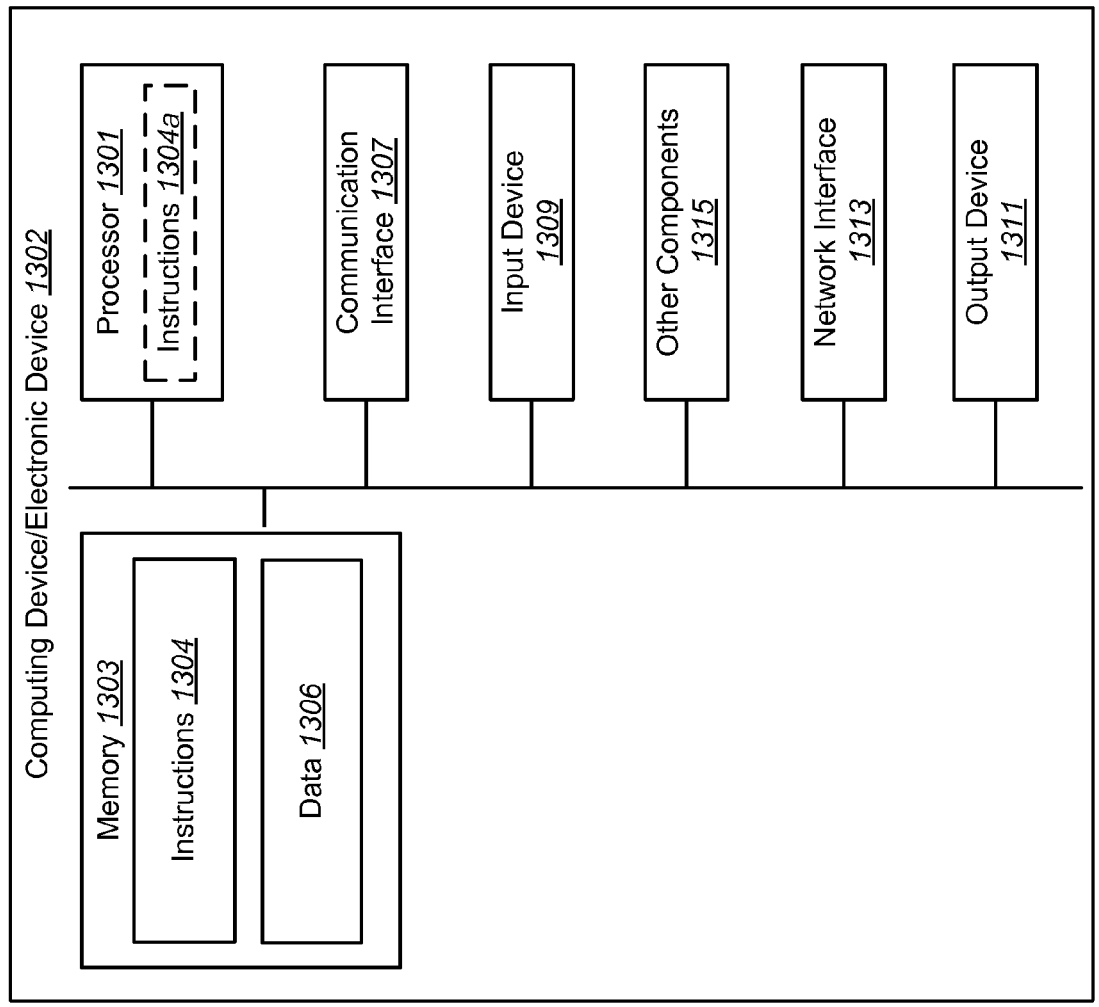
FIG. 13 is a block diagram illustrating various components that may be utilized in a computing device/electronic device.

FIG. 13 is a block diagram illustrating various components that may be utilized in a computing device/electronic device 1302. The computing device/electronic device 1302 may implement a power management console 204, a utility meter 210, a HAN controller 212, or a HAN device 214. Thus, although only one computing device/electronic device 1302 is shown, the configurations herein may be implemented in a distributed system using many computer systems. Computing devices/electronic devices 1302 may include the broad range of digital computers including microcontrollers, hand-held computers, personal computers, servers, mainframes, supercomputers, minicomputers, workstations, and any variation or related device thereof.

The computing device/electronic device 1302 is shown with a processor 1301 and memory 1303. The processor 1301 may control the operation of the computing device/electronic device 1302 and may be embodied as a microprocessor, a microcontroller, a digital signal processor (DSP) or other device known in the art. The processor 1301 typically performs logical and arithmetic operations based on program instructions stored within the memory 1303. The instructions 1304 in the memory 1303 may be executable to implement the methods described herein.

The computing device/electronic device 1302 may also include one or more communication interfaces 1307 and/or network interfaces 1313 for communicating with other electronic devices. The communication interface(s) 1307 and the network interface(s) 1313 may be based on wired communication technology, and/or wireless communication technology, such as ZigBee.

The computing device/electronic device 1302 may also include one or more input devices 1309 and one or more output devices 1311. The input devices 1309 and output devices 1311 may facilitate user input/user output. Other components 1315 may also be provided as part of the computing device/electronic device 1302.

Data 1306 and instructions 1304 may be stored in the memory 1303. The processor 1301 may load and execute instructions 1304a from the instructions 1304 in memory 1303 to implement various functions. Executing the instructions 1304 may involve the use of the data 1306 that is stored in the memory 1303. The instructions 1304 are executable to implement one or more of the processes or configurations shown herein, and the data 1306 may include one or more of the various pieces of data described herein.

The memory 1303 may be any electronic component capable of storing electronic information. The memory 1303 may be embodied as random access memory (RAM), read only memory (ROM), magnetic disk storage media, optical storage media, flash memory devices in RAM, on-board memory included with the processor, EPROM memory, EEPROM memory, an ASIC (Application Specific Integrated Circuit), registers, and so forth, including combinations thereof.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for estimating the effects of a request to change power usage, the method comprising:
   receiving, by a power management console, device data about one or more devices from a home area network controller;
   receiving, by the power management console, user behavior data about the devices;
   estimating, by the power management console, effects of a request to change power usage on a power grid using the device data and the user behavior data; and
   determining, by the power management console, whether to send the request to change power usage based on the estimated effects, wherein the effects of a request to change power usage is estimated before the request to change power usage is sent.

2. The method of claim 1, further comprising:
   receiving power data about power generation in the power grid; and
   estimating effects of a request to change power usage on the power grid using the device data, the user behavior data, and the power data.

3. The method of claim 1, further comprising:
   receiving customer preferences about the devices; and
   estimating effects of a request to change power usage on the power grid using the device data, the user behavior data, and the customer preferences.

4. The method of claim 1, wherein the user behavior data comprises one or more of the following: past device responses to requests to change power usage, typical behavior of the devices as a function of time, suggestions for reduction in power consumption, typical loads of the devices, typical loads of the house in which the devices reside, and anticipated power consumption of the devices.

5. The method of claim 1, wherein the request to change power usage is not sent based on a determination that the request to change power usage should not be sent.

6. The method of claim 1, further comprising sending the request to change power usage using one or more of the following: Z-Wave by Zensys, ZigBee Smart Energy (ZigBee SE), ZigBee Home Automation (ZigBee HA), Global System for Mobile communications (GSM), any of the HomePlug standards, Broadband over Power Lines (BPL), and Power Line Communication (PLC).

7. The method of claim 1, wherein the device data comprises one or more of the following: device type, geographic location, power consumption, current status, and anticipated power consumption.

8. The method of claim 2, wherein the power data comprises one or more of the following: an amount of power being generated in the power grid, sources of the power being generated, sources of stored power, current weather conditions, and the forecasted weather conditions.

9. The method of claim 1, wherein the request to change power usage is a request for reduced power consumption of one or more of the devices.

10. The method of claim 1, further comprising sending the request to change power usage to the home area network controller for the home area network controller to send the request to change power usage to the more devices.

11. The method of claim 1, further comprising sending the request to change power usage to a utility meter, wherein the utility meter sends the request to change power usage to the home area network controller for the home area network controller to send the request to change power usage to the devices.

12. The method of claim 2, further comprising storing the device data and the power data.

13. The method of claim 12, further comprising allowing third parties to access the stored device data and the stored power data.

14. The method of claim 1, further comprising generating reports based on the device data to assess the health of the devices.

15. The method of claim 1, wherein the estimating the effects of the request to change power usage comprises estimating a change in revenue associated with the request to change power usage.

16. The method of claim 1, wherein the estimating the effects of the request to change power usage comprises estimating a change in power consumption associated with the request to change power usage.

17. An apparatus for estimating the effects of a request to change power usage, comprising:
    a processor;
    memory in electronic communication with the processor;
    instructions stored in the memory, the instructions being executable by the processor to:
        receive device data about one or more devices from a home area network controller;
        receive user behavior data about the devices;
        estimate effects of a request to change power usage on a power grid using the device data and the user behavior data; and
        determine whether to send the request to change power usage based on the estimated effects, wherein the effects of a request to change power usage is estimated before the request to change power usage is sent.

18. The apparatus of claim 17, further comprising instructions executable to:
    receive power data about power generation in the power grid; and
    estimate effects of a request to change power usage on the power grid using the device data, the user behavior data, and the power data.

19. The apparatus of claim 17, further comprising instructions executable to:
    receive customer preferences about the devices; and
    estimate effects of a request to change power usage on the power grid using the device data, the user behavior data, and the customer preferences.

20. The apparatus of claim 17, wherein the user behavior data comprises one or more of the following: past device responses to requests to change power usage, typical behavior of the devices as a function of time, suggestions for reduction in power consumption, typical loads of the devices, typical loads of the house in which the devices reside, and anticipated power consumption of the devices.

21. The apparatus of claim 17, wherein the request to change power usage is not sent based on a determination that the request to change power usage should not be sent.

22. The apparatus of claim 17, further comprising instructions executable to send the request to change power usage using one or more of the following: Z-Wave by Zensys, ZigBee Smart Energy (ZigBee SE), ZigBee Home Automation (ZigBee HA), Global System for Mobile communications (GSM), any of the HomePlug standards, Broadband over Power Lines (BPL), and Power Line Communication (PLC).

23. The apparatus of claim 17, wherein the device data comprises one or more of the following: device type, geographic location, power consumption, current status, and anticipated power consumption.

24. The apparatus of claim 18, wherein the power data comprises one or more of the following: an amount of power being generated in the power grid, sources of the power being generated, sources of stored power, current weather conditions, and the forecasted weather conditions.

25. The apparatus of claim 17, wherein the request to change power usage is a request for reduced power consumption of the devices.

26. The apparatus of claim 17, further comprising instructions executable to send the request to change power usage to the home area network controller for the home area network controller to send the request to change power usage to the more devices.

27. The apparatus of claim 17, further comprising instructions executable to send the request to change power usage to a utility meter, wherein the utility meter sends the request to change power usage to the home area network controller for the home area network controller to send the request to change power usage to the devices.

28. The apparatus of claim 18, further comprising instructions executable to store the device data and the power data.

29. The apparatus of claim 28, further comprising instructions executable to allow third parties to access the stored device data and the stored power data.

30. The apparatus of claim 17, further comprising instructions executable to generate reports based on the device data to assess the health of the devices.

31. The apparatus of claim 17, wherein the instructions executable to estimate the effects of the request to change power usage comprise instructions executable to estimate a change in revenue associated with the request to change power usage.

32. The apparatus of claim 17, wherein the instructions executable to estimate the effects of the request to change power usage comprise instructions executable to estimate a change in power consumption associated with the request to change power usage.

33. A computer-readable medium comprising executable instructions, the executable instructions being executable by a power management console, the executable instructions for:
    receiving device data about one or more devices from a home area network controller;
    receiving user behavior data about the devices;
    estimating effects of a request to change power usage on a power grid using the device data and the user behavior data; and
    determining whether to send the request to change power usage based on the estimated effects, wherein the effects of a request to change power usage is estimated before the request to change power usage is sent.

34. A method for managing a device based on a request to change power usage, the method comprising:
    receiving, at a controller, a request to change power usage;
    determining, at the controller, how to adjust management of the device based on the request to change power usage, device data, and customer preferences, wherein the determination how to adjust management of the device comprises a determination to do nothing if customer preferences do not allow the adjustment;
    adjusting, at the controller, the management of the device based on the determining; and
    storing information about the adjustment.

35. The method of claim 34, wherein the device data comprises one or more of the following: device type, geographic location, power consumption, and current status.

36. The method of claim 34, wherein the request to change power usage is a request for reduced power consumption by the device.

37. The method of claim 34, wherein the request to change power usage is received using one or more of the following: Z-Wave by Zensys, ZigBee Smart Energy (ZigBee SE), ZigBee Home Automation (ZigBee HA), Global System for Mobile communications (GSM), any of the HomePlug standards, Broadband over Power Lines (BPL), and Power Line Communication (PLC).

38. The method of claim 34, wherein the adjusting comprises one or more of the following: taking no action, changing a setting on the device, or turning the device off based on the device data.

39. A controller for managing a device based on a request to change power usage, comprising:
  a processor;
  memory in electronic communication with the processor;
  instructions stored in the memory, the instructions being executable by the processor to:
    receive a request to change power usage;
    determine how to adjust management of the device based on the request to change power usage, device data, and customer preferences, wherein the determination how to adjust management of the device comprises a determination to do nothing if customer preferences do not allow the adjustment;
    adjust the management of the device based on the determining; and
    store information about the adjustment.

40. The controller of claim 39, wherein the device data comprises one or more of the following: device type, geographic location, power consumption, and current status.

41. The controller of claim 39, wherein the request to change power usage is a request for reduced power consumption by the device.

42. The controller of claim 39, wherein the request to change power usage is received using one or more of the following: Z-Wave by Zensys, ZigBee Smart Energy (ZigBee SE), ZigBee Home Automation (ZigBee HA), Global System for Mobile communications (GSM), any of the HomePlug standards, Broadband over Power Lines (BPL), and Power Line Communication (PLC).

43. The controller of claim 39, wherein the instructions executable to adjust comprise instructions executable to do one or more of the following: take no action, change a setting on the device, or turn the device off based on the device data.

44. A computer-readable medium comprising executable instructions, the executable instructions being executable by a controller, the executable instructions for:
  receiving a request to change power usage;
  determining how to adjust management of the device based on the request to change power usage, device data, and customer preferences, wherein the determination how to adjust management of the device comprises a determination to do nothing if customer preferences do not allow the adjustment;
  adjusting the management of the device based on the determining; and
  storing information about the adjustment.

* * * * *